US009766832B2

(12) United States Patent
Trimble et al.

(10) Patent No.: US 9,766,832 B2
(45) Date of Patent: Sep. 19, 2017

(54) SYSTEMS AND METHODS OF LOCATING REDUNDANT DATA USING PATTERNS OF MATCHING FINGERPRINTS

(71) Applicant: HITACHI DATA SYSTEMS CORPORATION, Santa Clara, CA (US)

(72) Inventors: Ronald Ray Trimble, Acton, MA (US); Jon Christopher Kennedy, Marlborough, MA (US); Timmie G. Reiter, Charlotte, NC (US); David Michael Biernacki, Woonsocket, RI (US); Carey Jay McMaster, Stow, MA (US); Stefan Merrill King, Belmont, MA (US)

(73) Assignee: HITACHI DATA SYSTEMS CORPORATION, Santa Clara, CA (US)

( * ) Notice: Subject to any disclaimer, the term of this patent is extended or adjusted under 35 U.S.C. 154(b) by 383 days.

(21) Appl. No.: 14/161,142

(22) Filed: Jan. 22, 2014

(65) Prior Publication Data

US 2014/0279956 A1    Sep. 18, 2014

Related U.S. Application Data

(60) Provisional application No. 61/800,763, filed on Mar. 15, 2013.

(51) Int. Cl.
*G06F 17/30* (2006.01)
*G06F 3/06* (2006.01)
*G06F 11/14* (2006.01)

(52) U.S. Cl.
CPC ............ *G06F 3/0641* (2013.01); *G06F 3/067* (2013.01); *G06F 3/0608* (2013.01);
(Continued)

(58) Field of Classification Search
CPC ... G06F 3/0641; G06F 3/0608; G06F 11/1453
See application file for complete search history.

(56) References Cited

U.S. PATENT DOCUMENTS

| 5,276,860 A | 1/1994 | Fortier et al. |
| 5,403,639 A | 4/1995 | Belsan et al. |

(Continued)

FOREIGN PATENT DOCUMENTS

| EP | 0774715 A1 | 5/1997 |
| KR | 1020060073724 | 6/2006 |

(Continued)

OTHER PUBLICATIONS

Bhagwat et al. "Extreme Binning: Scalable, Parallel Deduplication for Chunk-based File Backup". originally published in the Proceedings of the 17th IEEE/ACM International Symposium on Modelling, Analysis and Simulation of Computer and Telecommunication Systems, (MASCOTS' 2009) London, UK, Sep. 21-23, 2009.

(Continued)

*Primary Examiner* — Carol Choi
*Assistant Examiner* — Yuk Ting Choi
(74) *Attorney, Agent, or Firm* — Mattingly & Malur, PC

(57) ABSTRACT

A system configured to compute match potential between first data and second data is provided. The system includes data storage storing the first data and the second data, and at least one processor coupled to the data storage. The at least one processor is configured to identify a first sequence of fingerprints characterizing a first plurality of sections of the first data, the first sequence being ordered according to an order of the first plurality of sections within the first data; identify a second sequence of fingerprints comprising fingerprints that match fingerprints within the first sequence, the second sequence of fingerprints characterizing a second plurality of sections of the second data, the second sequence (Continued)

being ordered according to an order of the second plurality of sections within the second data; quantify a similarity between the first sequence and the second sequence; and adjust the match potential based on the similarity.

13 Claims, 25 Drawing Sheets

(52) U.S. Cl.
CPC .......... *G06F 3/0619* (2013.01); *G06F 3/0671* (2013.01); *G06F 11/1453* (2013.01); *G06F 11/1456* (2013.01)

(56) References Cited

U.S. PATENT DOCUMENTS

| | | | |
|---|---|---|---|
| 5,990,810 A | 11/1999 | Williams | |
| 6,101,472 A | 8/2000 | Giangarra et al. | |
| 6,366,986 B1 | 4/2002 | St. Pierre et al. | |
| 6,385,706 B1 | 5/2002 | Ofek et al. | |
| 6,477,544 B1 | 11/2002 | Bolosky et al. | |
| 6,542,906 B2 | 4/2003 | Korn | |
| 6,704,730 B2 | 3/2004 | Moulton et al. | |
| 6,714,952 B2 | 3/2004 | Dunham et al. | |
| 6,779,095 B2 | 8/2004 | Selkirk et al. | |
| 6,795,819 B2 | 9/2004 | Wheeler et al. | |
| 6,889,297 B2 | 5/2005 | Krapp et al. | |
| 7,024,427 B2 | 4/2006 | Bobbitt et al. | |
| 7,043,727 B2 | 5/2006 | Bennett et al. | |
| 7,055,008 B2 | 5/2006 | Niles et al. | |
| 7,065,619 B1 | 6/2006 | Zhu et al. | |
| 7,116,249 B2 | 10/2006 | McCanne et al. | |
| 7,146,476 B2 | 12/2006 | Sandorfi et al. | |
| 7,155,585 B2 | 12/2006 | Lam et al. | |
| 7,181,373 B2 | 2/2007 | Le Cocq et al. | |
| 7,251,680 B2 | 7/2007 | DeVos | |
| 7,373,603 B1 | 5/2008 | Yalovsky et al. | |
| 7,430,647 B2 | 9/2008 | Sandorfi et al. | |
| 7,457,934 B2 | 11/2008 | Yagawa | |
| 7,472,242 B1 | 12/2008 | Deshmukh et al. | |
| 7,552,358 B1 | 6/2009 | Asgar-Deen et al. | |
| 7,555,755 B2 | 6/2009 | Fairweather | |
| 7,590,808 B2 | 9/2009 | Lam et al. | |
| 7,822,725 B2 | 10/2010 | Walliser et al. | |
| 7,885,972 B2 | 2/2011 | Pragada et al. | |
| 7,941,440 B2 | 5/2011 | Pragada | |
| 7,962,499 B2 | 6/2011 | Lam | |
| 8,078,634 B2 | 12/2011 | Pragada et al. | |
| 8,121,993 B2 | 2/2012 | Blount et al. | |
| 8,140,821 B1 | 3/2012 | Raizen et al. | |
| 8,156,306 B1 | 4/2012 | Raizen et al. | |
| 8,214,392 B2 | 7/2012 | Pragada et al. | |
| 8,271,313 B2 | 9/2012 | Williams et al. | |
| 8,280,926 B2 | 10/2012 | Sandorfi et al. | |
| 8,285,690 B2 | 10/2012 | Nakamura et al. | |
| 8,320,578 B2 | 11/2012 | Kahn et al. | |
| 8,348,675 B2 | 1/2013 | Dohrmann | |
| 8,359,472 B1* | 1/2013 | Ren | G06F 17/30628 713/176 |
| 8,364,136 B2 | 1/2013 | Hoffberg et al. | |
| 2002/0059505 A1 | 5/2002 | St. Pierre et al. | |
| 2002/0091710 A1 | 7/2002 | Dunham et al. | |
| 2003/0014462 A1 | 1/2003 | Bennett et al. | |
| 2003/0074378 A1 | 4/2003 | Midgley et al. | |
| 2003/0105912 A1 | 6/2003 | Noren | |
| 2003/0145248 A1 | 7/2003 | McNeil | |
| 2003/0158831 A1 | 8/2003 | Zaremba | |
| 2003/0177149 A1 | 9/2003 | Coombs | |
| 2005/0060643 A1* | 3/2005 | Glass | G06F 17/241 715/205 |
| 2005/0108486 A1 | 5/2005 | Sandorfi | |
| 2005/0193235 A1 | 9/2005 | Sandorfi et al. | |
| 2006/0059207 A1 | 3/2006 | Hirsch et al. | |
| 2006/0282430 A1* | 12/2006 | Diamond | G06F 17/30985 707/999.006 |
| 2007/0050423 A1 | 3/2007 | Whalen et al. | |
| 2007/0101074 A1 | 5/2007 | Patterson | |
| 2007/0255758 A1 | 11/2007 | Zheng et al. | |
| 2008/0016131 A1 | 1/2008 | Sandorfi et al. | |
| 2008/0028007 A1 | 1/2008 | Ishii et al. | |
| 2008/0034017 A1 | 2/2008 | Giampaolo et al. | |
| 2008/0034073 A1* | 2/2008 | McCloy | H04L 63/0236 709/223 |
| 2008/0082310 A1 | 4/2008 | Sandorfi et al. | |
| 2008/0184001 A1 | 7/2008 | Stager | |
| 2008/0243914 A1 | 10/2008 | Prahlad et al. | |
| 2008/0275866 A1 | 11/2008 | Pragada et al. | |
| 2008/0275911 A1 | 11/2008 | Sandorfi et al. | |
| 2008/0294696 A1 | 11/2008 | Frandzel | |
| 2008/0301134 A1 | 12/2008 | Miller et al. | |
| 2009/0172326 A1 | 7/2009 | Sandorfi | |
| 2009/0177661 A1 | 7/2009 | Sandorfi et al. | |
| 2009/0193219 A1 | 7/2009 | Ohira et al. | |
| 2009/0300321 A1 | 12/2009 | Balachandran et al. | |
| 2009/0307251 A1 | 12/2009 | Heller et al. | |
| 2010/0017487 A1 | 1/2010 | Patinkin | |
| 2010/0088296 A1 | 4/2010 | Periyagaram et al. | |
| 2010/0095158 A1 | 4/2010 | Shah-Hosseini | |
| 2010/0185922 A1* | 7/2010 | Haas | G06F 17/30286 714/777 |
| 2010/0188273 A1 | 7/2010 | He et al. | |
| 2010/0198797 A1 | 8/2010 | Wideman | |
| 2011/0016095 A1 | 1/2011 | Anglin et al. | |
| 2011/0022718 A1* | 1/2011 | Evans | G06F 3/0608 709/231 |
| 2011/0022989 A1 | 1/2011 | Lin et al. | |
| 2011/0072017 A1 | 3/2011 | Pragada | |
| 2011/0093501 A1 | 4/2011 | Pragada et al. | |
| 2011/0099200 A1 | 4/2011 | Blount et al. | |
| 2011/0145253 A1 | 6/2011 | Pragada et al. | |
| 2011/0145254 A1 | 6/2011 | Pragada et al. | |
| 2011/0184921 A1 | 7/2011 | Reiter et al. | |
| 2011/0184966 A1 | 7/2011 | Reiter et al. | |
| 2011/0184967 A1 | 7/2011 | Reiter et al. | |
| 2011/0185133 A1* | 7/2011 | Reiter | G06F 11/1453 711/156 |
| 2011/0273982 A1 | 11/2011 | Akirav et al. | |
| 2011/0307447 A1 | 12/2011 | Sabaa et al. | |
| 2012/0089574 A1 | 4/2012 | Doerner | |
| 2012/0124011 A1* | 5/2012 | Spackman | G06F 17/30162 707/692 |
| 2012/0150954 A1 | 6/2012 | Tofano | |
| 2012/0166448 A1 | 6/2012 | Li et al. | |
| 2012/0191669 A1 | 7/2012 | Kennedy et al. | |
| 2012/0191670 A1* | 7/2012 | Kennedy | G06F 11/1453 707/692 |
| 2012/0253484 A1 | 10/2012 | Burich et al. | |
| 2012/0254934 A1 | 10/2012 | McBrearty et al. | |
| 2013/0120379 A1 | 5/2013 | Adair et al. | |

FOREIGN PATENT DOCUMENTS

WO 2005017686 A2 2/2005
WO 2005033945 A1 4/2005

OTHER PUBLICATIONS

Meiri et al. "Parallel Compression of Correlated Files". 2007 IEEE International Conference on Cluster Computing. pp. 285-292. Sep. 2007.
Zhu et al. "Avoiding the Disk Bottleneck in the Data Domain Deduplication File System". FAST '08 6th USENIX Conference on File and Storage Technologies. San Jose, CA, Feb. 26-29, 2008.

* cited by examiner

```
Offset 1 to 0 (+2 each)
50 <= (51-1) <= 50  Yes +1
50 <= (51-1) <= 50  Yes +1
Offset 2 to 1 (+1 each)
51 <= (52-1) <= 51  Yes +1
51 <= (53-1) <= 51  No
Offset 2 to 0 (+1 each)
50 <= (52-2) <= 50  Yes +1
50 <= (53-2) <= 50  No
Offset 3 to 2 (+2 each)
52 <= (53-1) <= 53  Yes +1
52 <= (54-1) <= 53  Yes +1
Offset 3 to 1 (+1 each)
51 <= (53-2) <= 51  Yes +1
51 <= (54-2) <= 51  No
Offset 3 to 0 (+1 each)
50 <= (53-3) <= 50  Yes +1
50 <= (54-3) <= 50  No
Offset 13 to 3 (+2 each)
53 <= (63-10) <= 54  Yes +1
53 <= (64-10) <= 54  Yes +1
Offset 13 to 2 (+2 each)
52 <= (63-11) <= 53  Yes +1
52 <= (64-11) <= 53  Yes +1
Offset 13 to 1 (+1 each)
51 <= (63-12) <= 51  Yes +1
51 <= (64-12) <= 51  No
Offset 14 to 13 (+1 each)
63 <= (64-1) <= 64  Yes +1
63 <= (83-1) <= 64  No
Offset 14 to 3 (+1 each)
53 <= (64-11) <= 54  Yes +1
53 <= (83-11) <= 54  No
Offset 14 to 2 (+1 each)
52 <= (64-12) <= 53  Yes +1
52 <= (83-12) <= 53  No
Offset 15 to 14 (+2 each)
64 <= (65-1) <= 83  Yes +1
64 <= (66-1) <= 83  Yes +1
Offset 15 to 13 (+2 each)
63 <= (65-2) <= 64  Yes +1
63 <= (66-2) <= 64  Yes +1
Offset 15 to 3 (+2 each)
53 <= (65-12) <= 54  Yes +1
53 <= (66-12) <= 54  Yes +1
Offset 16 to 15 (+2 each)
65 <= (67-1) <= 66  Yes +1
65 <= (67-1) <= 66  Yes +1
Offset 16 to 14 (+2 each)
64 <= (67-2) <= 83  Yes +1
64 <= (67-2) <= 83  Yes +1
Offset 16 to 13 (+2 each)
63 <= (67-3) <= 64  Yes +1
63 <= (67-3) <= 64  Yes +1
Offset 17 to 16 (+2 each)
67 <= (68-1) <= 67  Yes +1
67 <= (68-1) <= 67  Yes +1
Offset 17 to 15 (+2 each)
65 <= (68-2) <= 66  Yes +1
65 <= (68-2) <= 66  Yes +1
Offset 17 to 14 (+2 each)
64 <= (68-3) <= 83  Yes +1
64 <= (68-3) <= 83  Yes +1
```

FIG. 24

SYSTEMS AND METHODS OF LOCATING REDUNDANT DATA USING PATTERNS OF MATCHING FINGERPRINTS

RELATED APPLICATIONS

This application claims priority under 35 U.S.C. §119(e) to U.S. Provisional Application Ser. No. 61/800,763, entitled "SYSTEMS AND METHODS FOR LOCATING REDUNDANT DATA USING FINGERPRINT PATTERN MATCHING," filed on Mar. 15, 2013, which is hereby incorporated herein by reference in its entirety.

BACKGROUND

Technical Field

Aspects and embodiments relate to data storage, and more particularly to apparatus and methods for identifying redundant data stored in data storage.

Discussion

Given the costs associated with conventional tape libraries and other sorts of back-up storage media, storage system vendors often incorporate de-duplication processes into their product offerings to decrease the amount of required back-up media. De-duplication is a process of identifying repeating sequences of data and preventing or removing redundant storage of the repeating sequences of data. De-duplication is typically implemented as a function of a target device, such as a back-up storage device. The act of identifying redundant data within back-up data streams is complex, and in the current state-of-the-art, is conventionally solved using either hash fingerprinting or pattern recognition.

In hash fingerprinting, the incoming data stream first undergoes an alignment process (which attempts to predict good "breakpoints," also known as edges, in the data stream that will provide the highest probability of subsequent matches) and then is subject to a hashing process (usually SHA-1 or SHA-2 in the current state-of-the-art). The data stream is broken into chunks (usually about 8 kilobytes-12 kilobytes in size) by the hashing process; each chunk is assigned its resultant hash value. This hash value is compared against a memory-resident table. If the hash entry is found, the data is assumed to be redundant and replaced with a pointer to the existing block of data already stored in a disk storage system; the location of the existing data is given in the table. If the hash entry is not found, the data is stored in a disk storage system and its location recorded in the memory-resident table along with its hash. Some examples that illustrate this mechanism can be found in U.S. Pat. No. 7,065,619 assigned to Data Domain and U.S. Pat. No. 5,990,810 assigned to Quantum Corporation. Hash fingerprinting is typically executed in-line, that is, data is processed in real-time prior to being written to disk.

According to pattern recognition, the incoming data stream is first "chunked" or segmented into relatively large data blocks (on the order of about 32 MB). The data is then processed by a simple rolling hash method whereby a list of hash values is assembled. A transformation is made on the hash values where a resulting small list of values represents a data block "fingerprint." A search is then made on a table of hashes to look for at least a certain number of fingerprint hashes to be found in any other given stored block. If a minimum number of matches is not met, then the block is considered unique and stored directly to disk. The corresponding fingerprint hashes are added to a memory-resident table. Should the minimum number of matches be met, then there is a probability that the current data block matches a previously-stored data block. In this case, the block of disk storage associated with a matching fingerprint is read into memory and compared byte-for-byte against the candidate block that had been hashed. If the full sequence of data is equal, then the data block is replaced by a pointer to the physically addressed block of storage. If the full block does not match, then a mechanism that detects changed portions within the block is employed to determine a minimal data set within the block that needs be stored. The result is a combination of unique data plus references to a closely-matching block of previously-stored data. An example that illustrates this mechanism can be found in U.S. Patent Application US2006/0059207 assigned to Diligent Corporation. As with hash fingerprinting above, pattern recognition is typically executed in-line.

SUMMARY

Aspects and examples disclosed herein present de-duplication techniques that are more efficient and scalable than conventional de-duplication techniques. Some examples manifest an appreciation that conventional hash fingerprinting techniques are constrained by the amount of available memory. Other examples reflect an understanding that random I/O workload is a substantial limitation under the pattern recognition approach. Thus, these examples manifest an appreciation of the limitations imposed by the conventional hash fingerprinting and pattern recognition de-duplication techniques.

For instance, some examples and embodiments include a data navigation component configured to execute a data navigation process that identifies sections of data that are likely to include redundant information. In these examples and embodiments, the data navigation process identifies fingerprints (e.g., sets of summaries of data) that match one another. Responsive to identifying two or more matching fingerprints, the data navigation process scans fingerprints that neighbor the matching fingerprints to determine whether each of the matching fingerprints is part of a pattern similar to a pattern comprising the other. The data navigation process initiates further de-duplication processing of the data characterized by the fingerprints that depends, at least in part, on a degree of similarity between the patterns that comprise each of matching fingerprints.

According to at least one embodiment, a method of computing match potential between first data and second data is provided. The method includes acts of identifying a first sequence of fingerprints characterizing a first plurality of sections of the first data, the first sequence being ordered according to an order of the first plurality of sections within the first data; identifying a second sequence of fingerprints comprising fingerprints that match fingerprints within the first sequence, the second sequence of fingerprints characterizing a second plurality of sections of the second data, the second sequence being ordered according to an order of the second plurality of sections within the second data; quantifying a similarity between the first sequence and the second sequence; and adjusting the match potential based on the quantified similarity.

In the method, the act of identifying the first sequence of fingerprints may include an act of identifying the first sequence of fingerprints based on a prioritization scheme and the act of identifying the second sequence of fingerprints may include an act of identifying the second sequence of fingerprints based on the prioritization scheme. The act of identifying the first sequence of fingerprints may include an act of identifying a first sequence of fingerprints characterizing a first plurality of sections including one or more sections characterized by fingerprints other than fingerprints included in the second sequence.

In the method, the first sequence may include a first plurality of subsequences, the second sequence may include a second plurality of subsequences, and the act of quantifying the similarity may include an act of quantifying a similarity between at least one first subsequence of the first plurality of subsequences and at least one second subsequence of the second plurality of subsequences. The act of quantifying the similarly may include an act of quantifying a similarity between subsequences of the first plurality of subsequences that overlap other subsequences of the first plurality of subsequences and subsequences of the second subsequences that overlap other subsequences of the second plurality of subsequences. The act of quantifying the similarity between the at least one first subsequence and the at least one second subsequence may include an act of computing at least one score for at least one first section of the first plurality of sections, the at least one first section being characterized by one or more fingerprints within the at least one first subsequence.

In the method, the at least one first section may be associated with a matching range that identifies at least one first ordinal position within the second data, the at least one first ordinal position may be one or more ordinal positions of one or more of the second plurality of sections, the one or more of the second plurality of sections may be characterized by one or more fingerprints that match one or more fingerprints characterizing the at least one first section, and the act of computing the at least one score for the at least one first section may include acts of selecting a plurality of combinations of sections from a subset of the first data, the subset being characterized by fingerprints included in the at least one first subsequence, each of the plurality of combinations including the at least one first section and at least one second section of the subset, the at least one second section being associated with one or more matching sections within the second plurality of sections, the one or more matching sections being characterized by at least one fingerprint that matches at least one fingerprint characterizing the second section; computing one or more adjusted ordinal positions for the one or more matching sections based on an ordinal position of the first section, an ordinal position of the second section, and one or more ordinal positions of the one or more matching sections; and increasing the score for each adjusted ordinal position of the one or more adjusted ordinal positions disposed within the matching range of the at least one first section.

The method may further comprise an act of terminating quantification the similarity when the at least one first ordinal position is less than at least one second ordinal position identified in a matching range associated with a section of the first data having an ordinal position that is greater than the at least one first section. In the method, the at least one first ordinal position may include a plurality of ordinal positions and the act of increasing the score may include an act of increasing the score for each adjusted ordinal position within a matching range that identifies the plurality of ordinal positions. In the method, the plurality of ordinal positions may include two ordinal positions, one of the two ordinal positions being a minimum ordinal position of the at least one first section, and another of the two positions being a maximum ordinal position of the at least one first section. The act of increasing the score may include an act of increasing the score for each adjusted ordinal position within a matching range that identifies the minimum ordinal position and the maximum ordinal position. The method may further comprise acts of selecting the first data and the second data from a plurality of data based on the match potential and de-duplicating the first data and the second data.

According to another embodiment, a system configured to compute match potential between first data and second data is provided. The system includes data storage storing the first data and the second data, and at least one processor coupled to the data storage. The at least one processor is configured to identify a first sequence of fingerprints characterizing a first plurality of sections of the first data, the first sequence being ordered according to an order of the first plurality of sections within the first data; identify a second sequence of fingerprints comprising fingerprints that match fingerprints within the first sequence, the second sequence of fingerprints characterizing a second plurality of sections of the second data, the second sequence being ordered according to an order of the second plurality of sections within the second data; quantify a similarity between the first sequence and the second sequence; and adjust the match potential based on the quantified similarity.

In the system, the first sequence may include a first plurality of subsequences, the second sequence may include a second plurality of subsequences, and the at least one processor may be configured to quantify the similarity by quantifying a similarity between at least one first subsequence of the first plurality of subsequences and at least one second subsequence of the second plurality of subsequences. The at least one processor may be configured to quantify the similarly by quantifying a similarity between subsequences of the first plurality of subsequences that overlap other subsequences of the first plurality of subsequences and subsequences of the second subsequences that overlap other subsequences of the second plurality of subsequences. The at least one processor may also be configured to quantify the similarity between the at least one first subsequence and the at least one second subsequence by, at least in part, computing at least one score for at least one first section of the first plurality of sections, the at least one first section being characterized by one or more fingerprints within the at least one first subsequence.

In the system, the at least one first section may be associated with a matching range that identifies at least one first ordinal position within the second data, the at least one first ordinal position may be one or more ordinal positions of one or more of the second plurality of sections, the one or more of the second plurality of sections may be characterized by one or more fingerprints that match one or more fingerprints characterizing the at least one first section, and the at least one processor may be configured to compute the at least one score by, at least in part, selecting a plurality of combinations of sections from a subset of the first data, the subset being characterized by fingerprints included in the at least one first subsequence, each of the plurality of combinations including the at least one first section and at least one second section of the subset, the at least one second section being associated with one or more matching sections within the second plurality of sections, the one or more matching sections being characterized by at least one fingerprint that matches at least one fingerprint characterizing the second section; computing one or more adjusted ordinal positions for the one or more matching sections based on an ordinal position of the first section, an ordinal position of the second section, and one or more ordinal positions of the one or more matching sections; and increasing the score for each adjusted ordinal position of the one or more adjusted ordinal positions disposed within the matching range of the at least one first section.

In the system, the at least one processor may be further configured to terminate quantification of the similarity when the at least one first ordinal position is less than at least one second ordinal position identified in a matching range associated with a section of the first data having an ordinal position that is greater than the at least one first section. The at least one first ordinal position may include a plurality of ordinal positions and the at least one processor may be configured to increase the score by, at least in part, increasing the score for each adjusted ordinal position within a matching range that identifies the plurality of ordinal positions. In the system, the plurality of ordinal positions may include two ordinal positions, one of the two ordinal positions being a minimum ordinal position of the at least one first section, and another of the two positions being a maximum ordinal position of the at least one first section. The at least one processor may be further configured to select the first data and the second data from a plurality of data based on the match potential and de-duplicate the first data and the second data.

According to another embodiment, a non-transitory computer readable medium storing computer readable instructions is provided. The computer readable instructions, when executed by at least one processor, instruct the at least one processor to perform a method of computing match potential between first data and second data. The method includes acts of identifying a first sequence of fingerprints characterizing a first plurality of sections of the first data, the first sequence being ordered according to an order of the first plurality of sections within the first data; identifying a second sequence of fingerprints comprising fingerprints that match fingerprints within the first sequence, the second sequence of fingerprints characterizing a second plurality of sections of the second data, the second sequence being ordered according to an order of the second plurality of sections within the second data; quantifying a similarity between the first sequence and the second sequence; and adjusting the match potential based on the quantified similarity. The instructions may further instruct the at least one processor to quantify the similarity by computing at least on score for at least one section of the first plurality of sections.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example or embodiment disclosed herein may be combined with any other example or embodiment. References to "an example," "an embodiment," "other examples," "other embodiments," "some examples," "some embodiments," "an alternate example," "an alternate embodiment," "various examples," "various embodiments," "one example," "one embodiment," "at least one example," "at least one embodiment," "this and other examples," "this and other embodiments," or the like are not necessarily mutually exclusive and are intended to indicate that a particular feature, structure, or characteristic described in connection with the example may be included in at least one example or embodiment. The appearances of such terms herein are not necessarily all referring to the same example or embodiment.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of the embodiments disclosed herein. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 24 is an illustration of results of the scoring method illustrated in FIG. 23.

DETAILED DESCRIPTION

Figure 1:
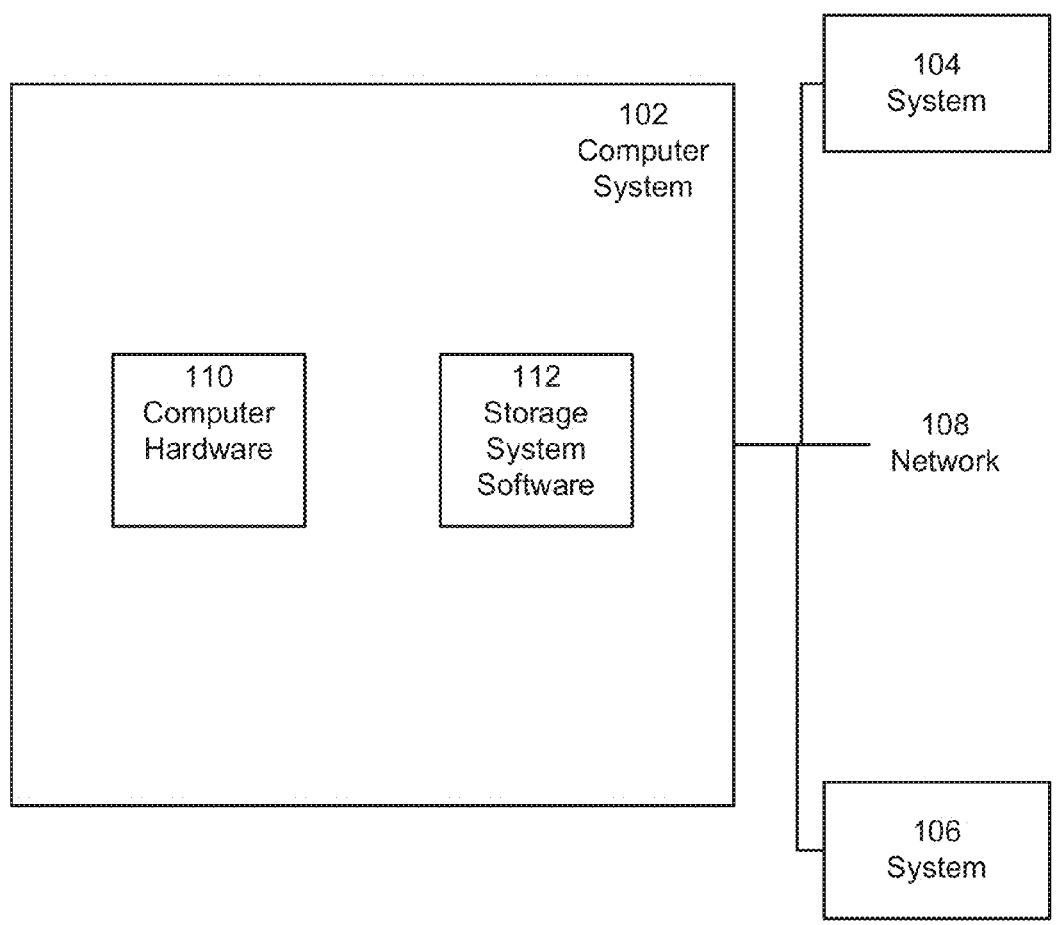
FIG. 1 is a block diagram of one example of a networked computing environment that includes a back-up storage system.

Aspects and embodiments disclosed herein relate to apparatus and processes for navigating data based on fingerprints that characterize the data. As referred to herein, the term "fingerprint" means a set of summaries that characterize data associated with the set of summaries. A set of summaries may include a single summary or a plurality of summaries having a common type or differing types. Examples of types of summaries that may be comprised within a set of summaries include strong hash values, weak hash values, and the like. In various embodiments, a fingerprint may characterize an amount of data different from another fingerprint. Thus fingerprints are not limited to a particular amount of data characterized, a particular type of summary, or a particular number of members of the set of summaries that constitute the fingerprint.

In some embodiments, a data navigation component is configured to locate sections of data likely to include redundant data using fingerprints associated with the data. These sections of data likely to include redundant data are referred to herein as having "match potential." In these embodiments, the data navigation component is also configured to initiate further de-duplication processing of the sections of data having match potential that meets one or more predetermined criterion.

More particularly, in some embodiments, the data navigation component is configured to identify fingerprints that match other fingerprints and to associate the data characterized by the matching fingerprints with some base degree of match potential. In these embodiments, the data navigation component is also configured to identify a sequence of these matching fingerprints that is ordered according to an order of the data characterized by the fingerprints. In at least one embodiment, the data navigation component is further configured to identify two or more subsequences within the sequence that each include at least two fingerprints that match.

In some embodiments, the data navigation component is configured to adjust the degree of match potential associated with data characterized by fingerprints included in the subsequences based on the similarity of the subsequences. The data navigation component may quantify the similarity of the subsequences based on the length of the subsequences and the values and ordinal positions of fingerprints within the subsequences. In some embodiments, the data navigation component adjusts the degree of match potential associated with data characterized by fingerprints within the subsequences based on the quantified similarity. The data navigation component may use the adjusted match potential of the data to prioritize subsequent de-duplication processing of the data.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Furthermore, the data manipulated by examples disclosed herein may be organized into various data objects on one or more computer systems. These data objects may include any structure in which data may be stored. A non-limiting list of exemplary data objects includes bits, bytes, data files, data blocks, data directories and back-up data sets.

Data Driven De-Duplication

Various examples disclosed herein effect data driven de-duplication of data stored on one or more computer systems. As is explained further below, data driven de-duplication processes harness underlying characteristics of the data to identify and remove redundant data more efficiently than conventional de-duplication processes. More specifically, data driven de-duplication processes inspect the structure and the content of data and tailor actions taken based on the particular nature of the data targeted for de-duplication. FIG. 1 illustrates a computer system 102 that is specially configured to perform a data driven de-duplication process according to the aspects and functions disclosed herein. As shown, the computer system 102 is coupled to, and can exchange data with, systems 104 and 106 via network 108. In addition, according to this example, the computer system 102 includes computer hardware 110 and storage system software 112. In at least one example, the computer hardware 110 shown in FIG. 1 includes a processor and a memory coupled to the processor. In one example, the memory includes volatile memory, such as RAM, and non-volatile memory, such as a magnetic disk. Other examples of the computer hardware 110 include a variety of components which are discussed further below with regard to FIGS. 3 and 4.

In the example illustrated in FIG. 1, the storage system software 112 includes elements, e.g. executable code and data structures, configured to cause the computer system 102 to perform data driven de-duplication processes. As will be explained in detail below, the storage system software 112 includes navigation software that has the ability to find regions of data with similar data based on fingerprints (e.g., hash values) calculated at locations driven by the data. A particular example of the elements included in the storage system software 112 is discussed further below with regard to FIG. 5.

Figure 2:
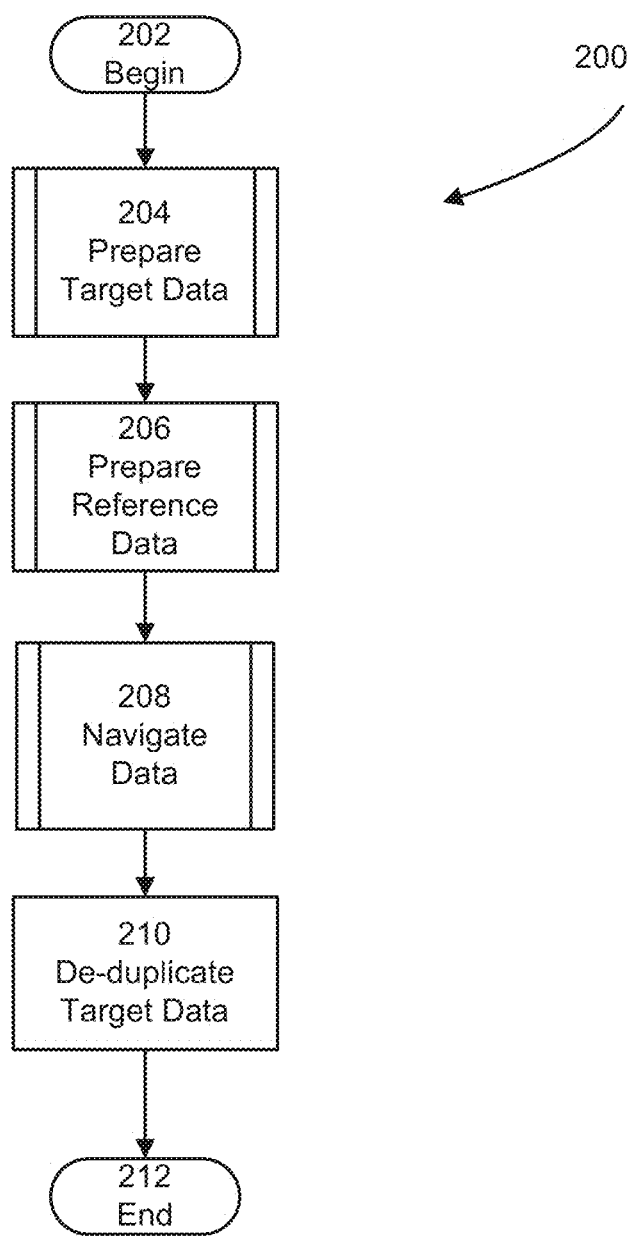
FIG. 2 is a flow diagram of a method for de-duplicating data objects.

An example of a data driven de-duplication process as defined by the storage system software 112 is illustrated as process 200 in FIG. 2. In this example, the process 200 includes acts of preparing data targeted for de-duplication, preparing data to be referenced during the de-duplication of the target data, navigating the reference data and de-duplicating the target data. Process 200 begins at 202.

In act 204, target data is prepared for de-duplication. According to various examples, a computer system prepares the target data by identifying location identifiers within the target data and generating fingerprints of data with reference to the location identifiers. Acts in accord with these examples are discussed below with reference to FIG. 12.

In act 206, reference data is prepared for de-duplication. According to various examples, a computer system prepares the reference data by identifying location identifiers within the reference data and generating fingerprints of data with reference to the location identifiers. Acts in accord with these examples are discussed below with reference to FIG. 13.

In act 208, target data and reference data is navigated to place swaths at locations matching a set of predefined criteria. According to several examples, a computer system positions the swaths relative to one or more regions of data in the target and the reference that have matching fingerprints. Acts in accord with these examples are discussed below with reference to FIG. 14.

In act 210, the target data is de-duplicated. According to a variety of examples, a network of computer systems performs a byte-by-byte comparison between the data in the target swath and the data in the reference swath. When a predetermined quantity of redundant data is found, the computer system replaces the redundant data included in target swath with a pointer to the matching data in the reference swath. In other examples, the network of computer systems calculates a hash value for the data in the target swath and the data in the reference swath using a hash function with strong collision resistance. In these examples, the network of computer systems ensures a high probability that both sets of data are identical prior to replacing the redundant data in the target swath with a pointer to the matching data in the reference swath. Further examples use various data de-duplication techniques known in the art and examples are not limited to a particular de-duplication technique or set of techniques.

Process 200 ends at 212. Data de-duplication activities in accord with process 200 make efficient use of data storage media by decreasing the amount of data that must be physically stored. In addition, data de-duplication activities in accord with process 200 efficiently de-duplicate data is that randomly distributed within target and reference data sets.

Computer System

As discussed above, aspects and functions disclosed herein may be implemented as hardware or software on one or more of these computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects may be implemented in software, hardware or firmware, or any combination thereof. Thus, aspects may be implemented within methods, acts, systems, system elements and components using a variety of hardware and software configurations, and examples are not limited to any particular distributed architecture, network, or communication protocol.

Figure 3:
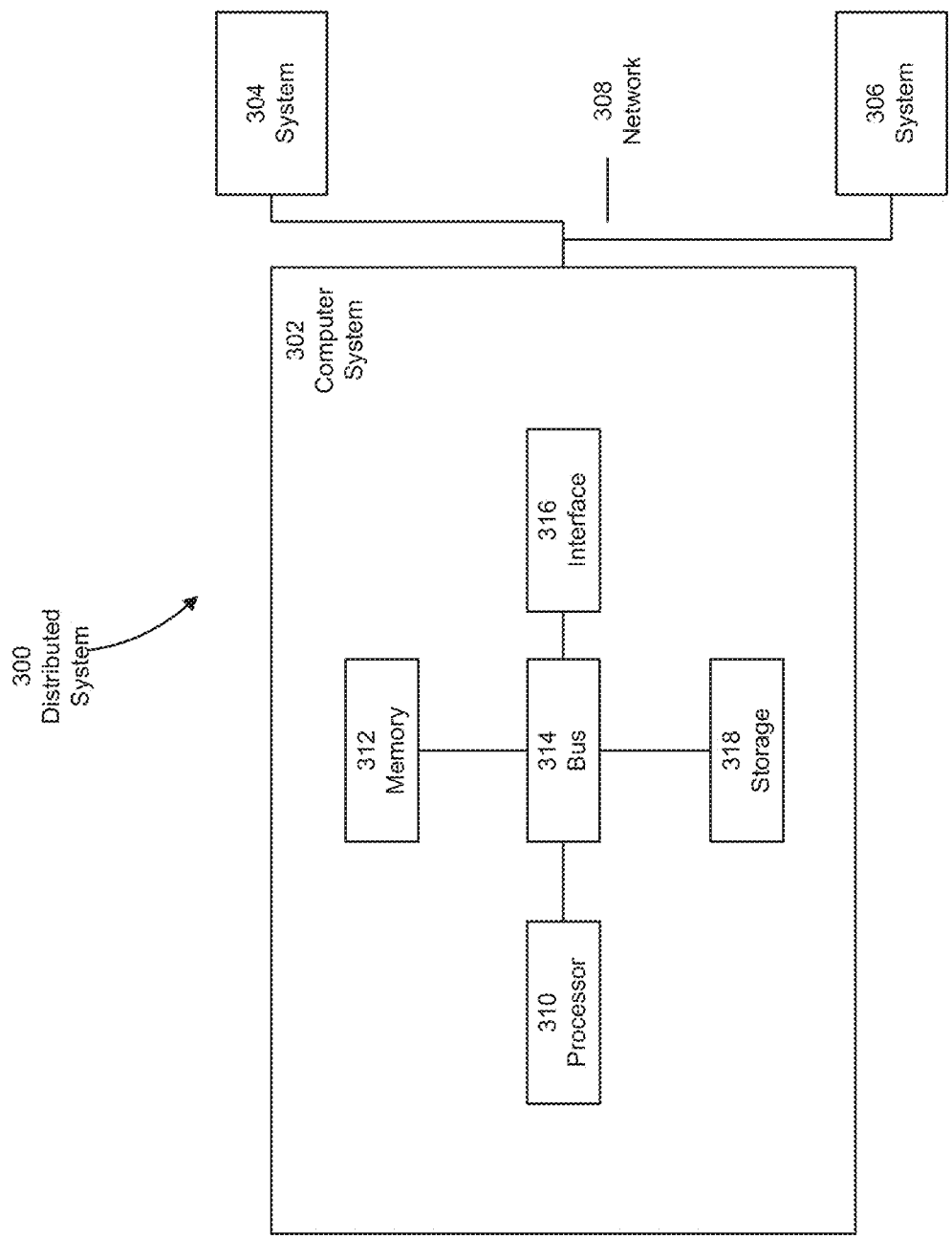
FIG. 3 is a block diagram of one example of a computer system that may be used to perform processes disclosed herein.

Referring to FIG. 3, there is illustrated a block diagram of a distributed computer system 300, in which various aspects and functions may be practiced. The distributed computer system 300 may include one more computer systems that exchange (i.e. send or receive) information. For example, as illustrated, the distributed computer system 300 includes computer systems 302, 304 and 306. As shown, the computer systems 302, 304 and 306 are interconnected by, and may exchange data through, communication a network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TSL, SSL or VPN. While the distributed computer system 300 illustrates three networked computer systems, the distributed computer system 300 is not so limited and may include any number of computer systems and computing devices, networked using any medium and communication protocol.

As discussed above with regard to FIG. 1, various aspects and functions may be implemented as specialized hardware or software executing in one or more computer systems. FIG. 3 illustrates a particular example of the elements that may be included in the computer hardware 110 shown in FIG. 1. As illustrated in FIG. 3, the computer system 302 includes a processor 310, a memory 312, a bus 314, an interface 316 and data storage 318. The processor 310 may perform a series of instructions that result in manipulated data. The processor 310 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 310 is connected to other system elements, including one or more memory devices 312, by the bus 314.

The memory 312 may be used for storing programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein.

Components of the computer system 302 may be coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. Thus, the bus 314 enables communications, for example, data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and communicate with external entities, such as users and other systems.

The data storage 318 may include a computer readable and writeable nonvolatile (non-transitory) data storage medium in which instructions are stored that define a program that may be executed by the processor 310. The data storage 318 also may include information that is recorded, on or in, the medium, and this information may be processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller may cause data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 may manipulate the data within the memory 312, and then copy the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as for example, an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. Usually, a processor or controller, such as the processor 310, executes an operating system which may be, for example, a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular implementation.

The processor 310 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform described functions.

Storage System

Figure 4:
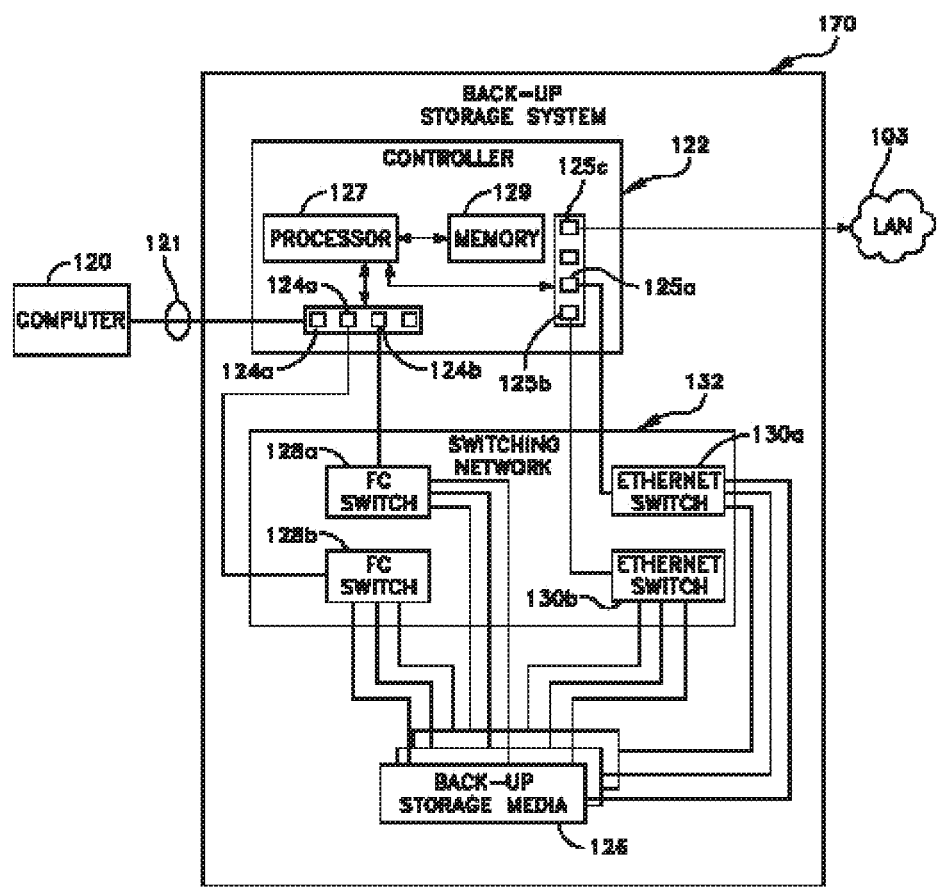
FIG. 4 is a block diagram of one example of a storage system configured to perform processes disclosed herein.

Some examples are directed toward a computer system specially configured as a data back-up storage system. FIG. 4 illustrates, in block diagram form, one example of a storage system 170. In this example, the hardware of the storage system 170 includes a storage system controller 122 and a switching network 132 that connects the storage system controller 122 to a back-up storage media 126. The storage system controller 122 includes a processor 127 (which may be a single processor or multiple processors) and a memory 129. The memory 129 may include volatile (such as RAM) and nonvolatile portions (such as ROM, PROM, EEPROM, Flash memory, magnetic disk, optical disk, etc. or combinations thereof) that may run all or some of the storage system software, as discussed further below. The memory 129 may also be used to store metadata relating to the data stored on the back-up storage media 126. Software, including programming code that implements functions disclosed herein, is generally stored on a computer readable and/or writeable nonvolatile recording medium, such as ROM, optical or magnetic disk or tape, etc., and then copied into memory 129 wherein it may then be executed by the processor 127. As discussed above with regard to FIG. 3, such programming code may be written in any of a plurality of programming languages, for example, Assembler, Java, Visual Basic, C, C#, or C++, Fortran, Pascal, Eiffel, Basic, COBOL, or combinations thereof, as the embodiments disclosed herein are not limited to a particular programming language. Typically, in operation, the processor 127 causes the programming code to be read from a nonvolatile recording medium into another form of memory, such as RAM, that allows for faster access to the information by the processor than does the nonvolatile recording medium.

As shown in FIG. 4, the controller 122 also includes a number of port adapters that couple the controller 122 to the computer system 120 and to the switching network 132. As illustrated, the computer system 120 is coupled to the storage system via a port adapter 124a, which may be, for example, a Fibre Channel port adapter. Via the storage system controller 122, the computer system 120 backs up data onto the back-up storage media 126 and can recover data from the back-up storage media 126.

In the illustrated example, the switching network 132 may include one or more Fibre Channel switches 128a, 128b. The storage system controller 122 includes a plurality of Fibre Channel port adapters 124b and 124c to couple the storage system controller to the Fibre Channel switches 128a, 128b. Via the Fibre Channel switches 128a, 128b, the storage system controller 122 allows data to be backed-up onto the back-up storage media 126. As illustrated in FIG. 4, the switching network 132 may further include one or more Ethernet switches 130a, 130b that are coupled to the storage system controller 122 via Ethernet port adapters 125a, 125b. In one example, the storage system controller 122 further includes another Ethernet port adapter 125c that may be coupled to, for example, a LAN 103 to enable the storage system 170 to communicate with other computer systems.

In the example illustrated in FIG. 4, the storage system controller 122 is coupled to the back-up storage media 126 via a switching network that includes two Fibre Channel switches and two Ethernet switches. Provision of at least two of each type of switch within the storage system 170 eliminates any single points of failure in the system. In other words, even if one switch (for example, Fibre Channel switch 128a) were to fail, the storage system controller 122 would still be able to communicate with the back-up storage media 126 via another switch. Such an arrangement may be advantageous in terms of reliability and speed. For example, as discussed above, reliability is improved through provision of redundant components and elimination of single points of failure. In addition, in some examples, the storage system controller 122 is able to back-up data onto the back-up storage media 126 using some or all of the Fibre Channel switches in parallel, thereby increasing the overall back-up speed. However, there is no requirement that the system comprise two or more of each type of switch, nor that the switching network comprise both Fibre Channel and Ethernet switches. Furthermore, in examples wherein the back-up storage media 126 comprises a single disk array, no switches at all may be necessary.

In one example, the back-up storage media 126 may include one or more disk arrays. In another example, the back-up storage media 126 include a plurality of ATA or SATA disks. Such disks are "off the shelf" products and may be relatively inexpensive compared to conventional storage array products from manufacturers such as EMC, IBM, etc. In accordance with one example, back-up storage media may be organized to implement any one of a number of RAID (Redundant Array of Independent Disks) schemes. For example, in one example, the back-up storage media may implement a RAID-5 implementation.

Although software may be described as being "included" in the storage system 170, and may be executed by the processor 127 of the storage system controller 122 (see FIG. 4), there is no requirement that all the software be executed on the storage system controller 122. Thus, there is no requirement that the storage system controller 122 be a contained physical entity such as a computer system. The storage system 170 may communicate with software that is resident on a computer system such as, for example, the media server(s) 114 or application servers 102. In addition, the storage system 170 may contain several software applications that may be run or resident on the same or different computer systems. Moreover, the storage system 170 is not limited to a discrete piece of equipment, although in some examples, the storage system 170 may be embodied as a discrete piece of equipment.

In one example, the storage system 170 is provided as a self-contained unit that acts as a "plug and play" (i.e., no modification need be made to existing back-up procedures and policies) replacement for conventional back-up systems. Such a storage system unit may also be used in a networked computing environment that includes a conventional back-up system to provide redundancy or additional storage capacity. In another example, the storage system 170 may be implemented in a distributed computing environment, such as a clustered or a grid environment.

Example System Architecture

Figure 5:
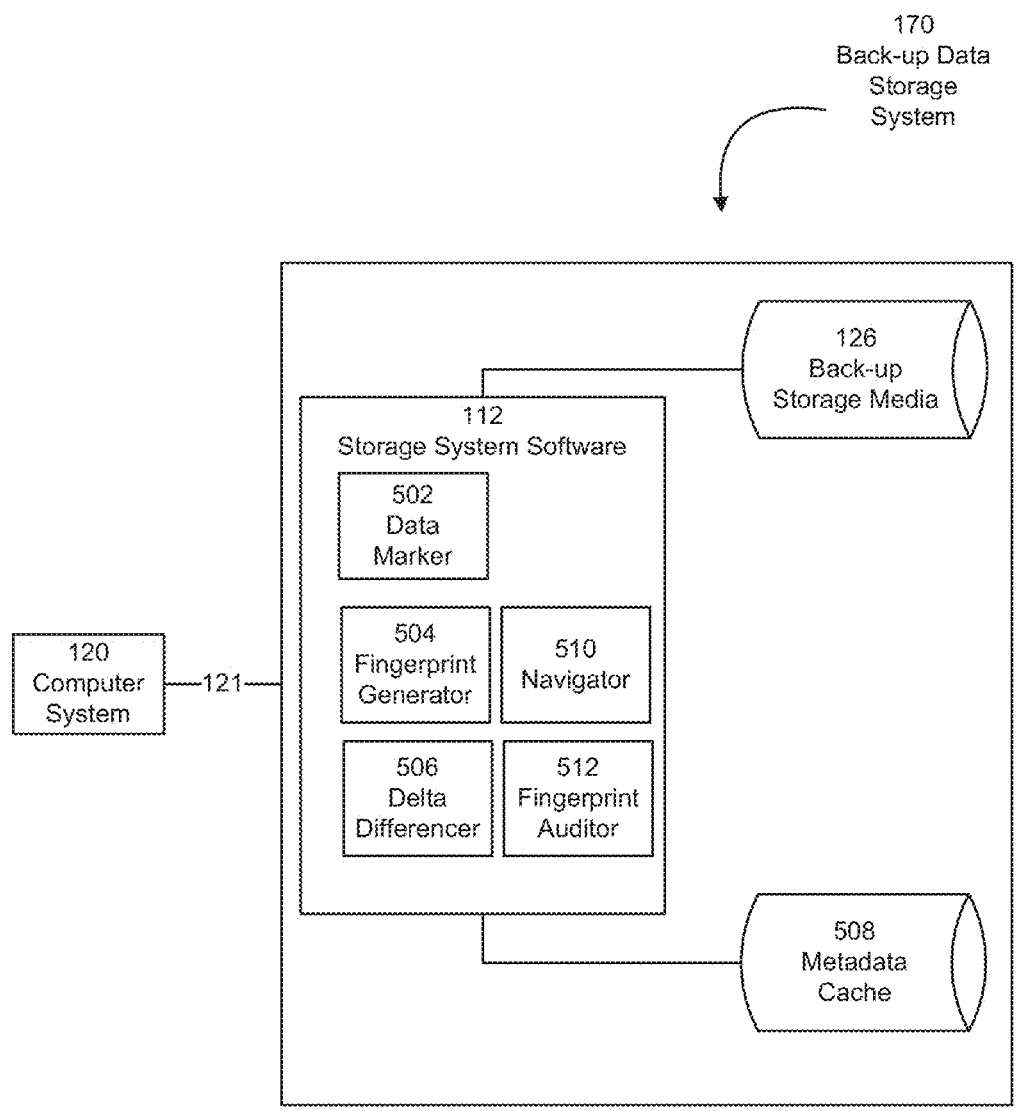
FIG. 5 is a block diagram illustrating a storage system in the context of a networked computing environment and configured to perform processes disclosed herein.

FIG. 5 presents, in block diagram form, physical and logical elements of a back-up storage system 170 in the context of a networked computing environment. The back-up storage system 170 includes hardware, as discussed above with reference to FIG. 3, and storage system software 112, as discussed above with regard to FIG. 1, that together interface with a computer system 120 (running the back-up/restore application). As shown, the storage system software 112 includes the following components: a data marker 502, a fingerprint generator 504, a delta differencer 506 and a navigator 510, which are discussed further below.

In this example, the back-up storage system 170 also includes a "logical metadata cache" 508 that stores metadata relating to data that is backed-up from the computer system 120 onto the storage system 170. As used herein, the term "metadata" refers to data that represents information about data and describes attributes of actual data. A non-limiting, exemplary list of metadata may include hash values, location identifiers, fingerprints (both micro and macro), data size, logical and/or physical location of the data in primary storage, one or more hash values representing the data, the creation date of the data, the date of the last modification of the data, the back-up policy name under which the data was stored, an identifier, e.g. a name or watermark, of the data and the data type of the data, e.g. a software application associated with the data. In various examples, the storage system software 112 uses the data stored in the logical metadata cache 508 in a variety of ways, as is discussed more fully below.

The back-up storage system 170 is one example of a system that is specially configured to perform the functions disclosed herein. However, the system structure and content recited with regard to FIG. 5 are for exemplary purposes only and are not intended to limit other examples to the specific structure shown in FIG. 5. It is to be appreciated that many variant system structures, such as the structure shown in FIG. 3, can be architected without deviating from the substance of the examples disclosed herein.

In addition, information may flow between the elements, components and subsystems described herein using any technique. Such techniques include, for example, passing the information over the network using standard protocols, such as TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the embodiments disclosed herein.

Also, in the illustrated example, a computer system 120 is coupled to the storage system 170 via a network 121. The network 121 may include one or more networks that support a variety of communication protocols. For example, the network 121 may be a public network, such as the internet, and may include other public or private networks such as LANs, WANs, extranets and intranets. According to one example, the network 121 is a Fibre Channel network that allows high-speed transfer of data between the computer system 120 and the storage system 170. The computer system 120 may enable back-up of data from any of the computers present in the networked computing environment or from a primary storage device, such as network accessible data storage. As discussed above, the storage system 170 includes back-up storage media 126 that may be, for example, one or more disk arrays. The back-up storage media 126 provide the actual storage space for back-up data from the computer system 120.

Figure 6:
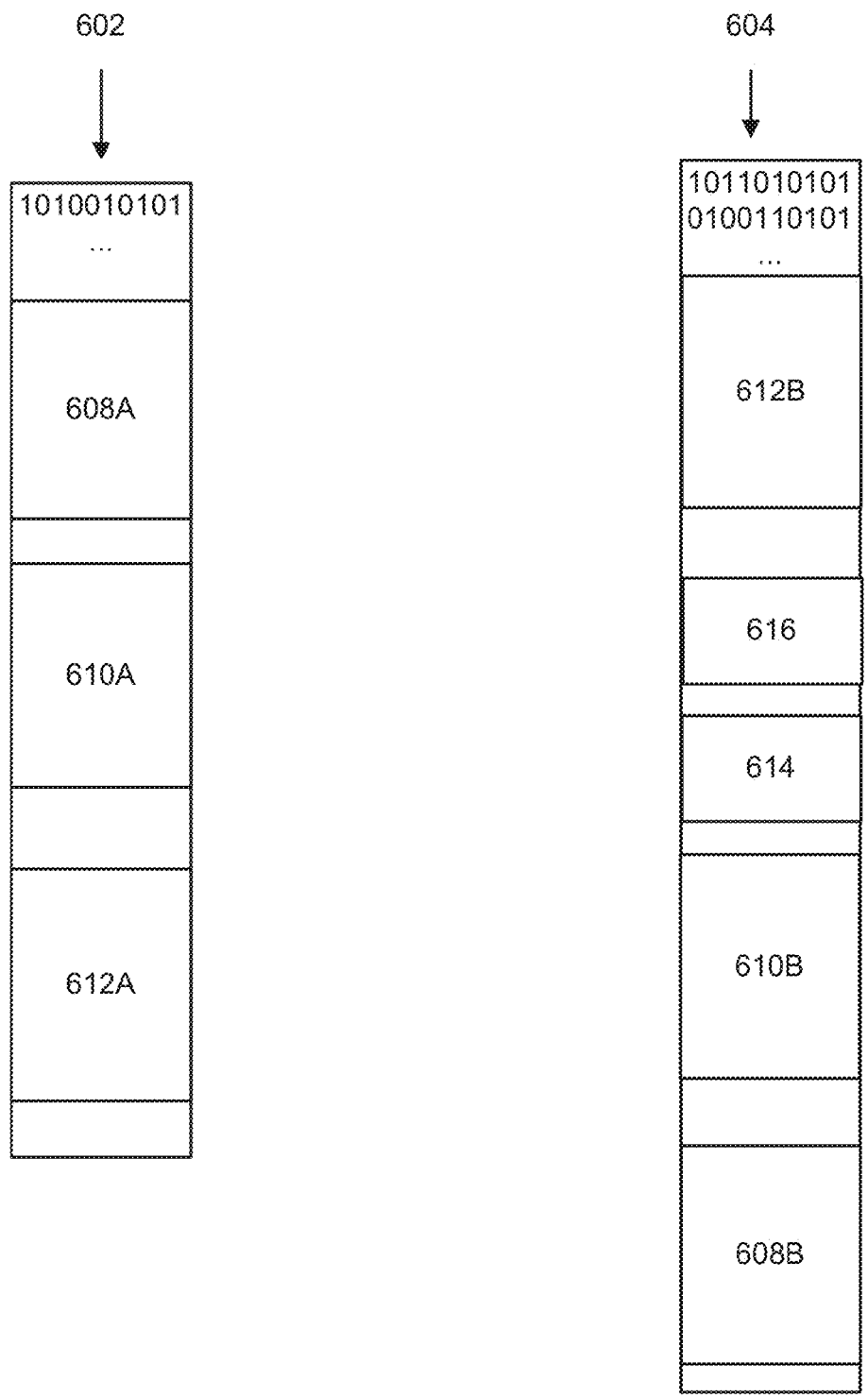
FIG. 6 is a schematic layout of one example of two data sets used in de-duplication processing.

According to a variety of examples, data may be stored on the back-up storage media 126 in discrete data sets that correspond to back-ups taken at different times or using different methodologies (for example, full or incremental back-ups). FIG. 6 illustrates an example data structure in which back-up data may be stored on the back-up storage media 126. FIG. 6 includes data sets 602 and 604. In this example, the data sets 602 and 604 include data stored by different back-up processes. In other examples, the data sets 602 and 604 may be created by any computerized process and examples disclosed herein are not limited to data created and stored by any particular process.

In some examples in accord with FIG. 5, the back-up storage system 170 performs a de-duplication process on data that are stored on the back-up storage media 126, such as the data sets 602 and 604 illustrated in FIG. 6. According to these examples, data de-duplication may be performed in-line, i.e. while the storage system 170 is receiving data to be de-duplicated and stored. In other examples, data de-duplication may be performed off-line, i.e. after the storage system 170 has already stored the data to be de-duplicated.

As illustrated in FIG. 6, the data set 602 is targeted for de-duplication and includes target regions 608A, 610A and 612A. These target regions may be, for example, partial or incremental backups of one or more primary systems. Also, according to this example, data set 604 is designated for use as a reference data set during the de-duplication of data set 602. As illustrated, the data set 604 includes data reference regions 608B, 610B, 612B, 614 and 616. These reference regions may be, for example, baseline or full backups of one or more primary systems. Further, in this example, the target region 608A contains the same data as reference region 608B, target region 610A contains the same data as reference region 610B and target region 612A contains the same data as reference region 612B. While the bulk of this disclosure assumes that the data sets 602 and 604 include multiple target regions and reference regions, other examples can work with data sets which include only one target region and one reference region. Thus, examples are not limited to a particular number of data sets, target regions or reference regions.

Figure 7:
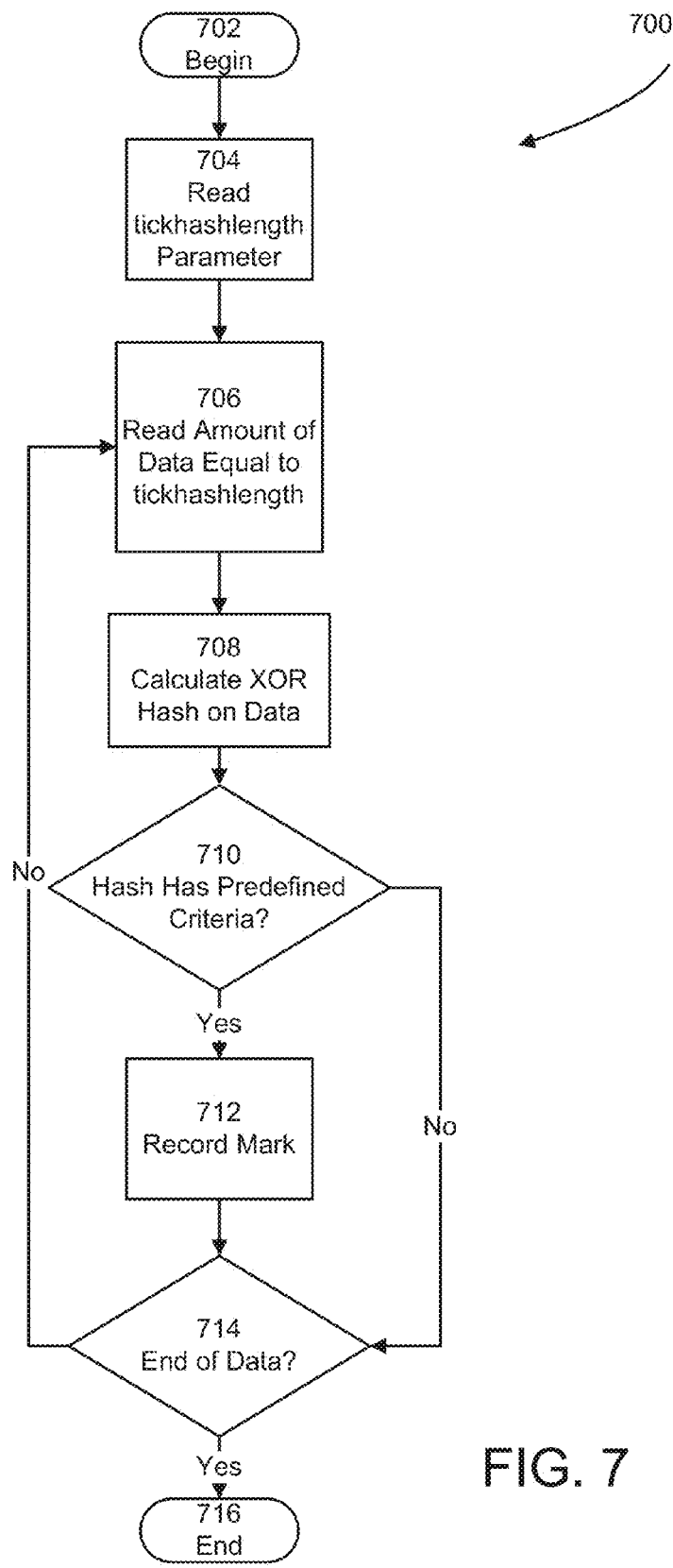
FIG. 7 is a flow diagram of a method for marking data for subsequent de-duplication processing.
Figure 12:
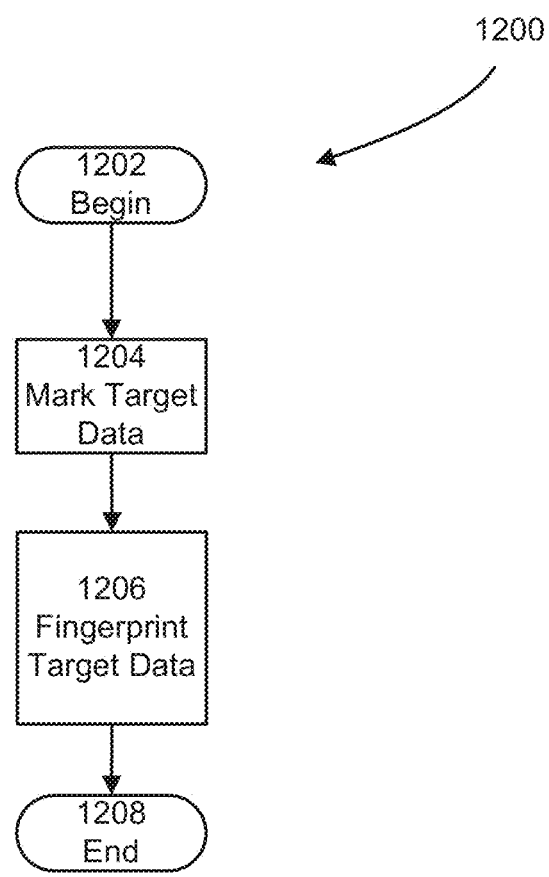
FIG. 12 is a flow diagram of a method for preparing target data.
Figure 13:
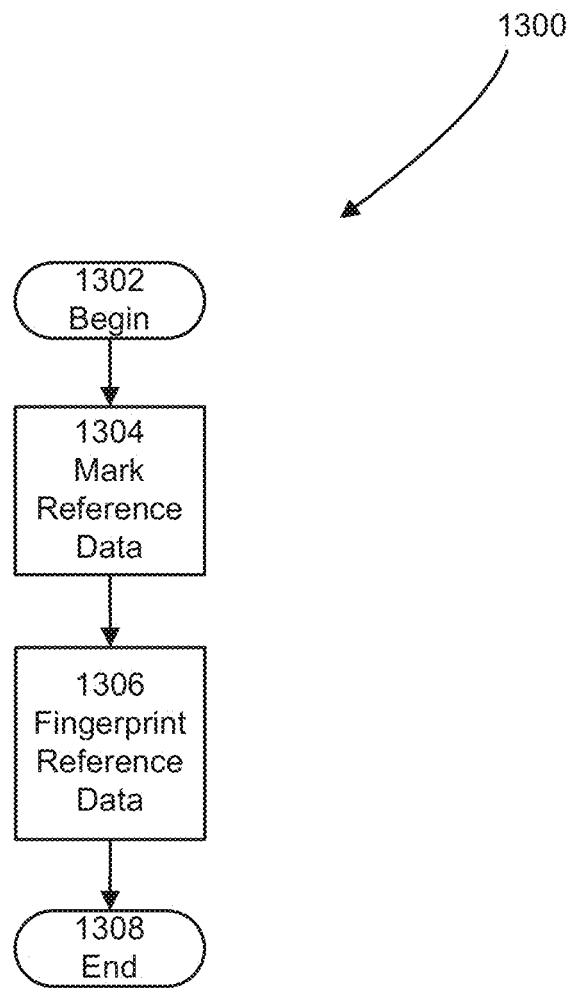
FIG. 13 is a flow diagram of a method for preparing reference data.

As discussed above in the example shown in FIG. 5, the storage system software 112 includes the data marker 502, the fingerprint generator 504, the delta differencer 506 and the navigator 510. Processes that the data marker 502 configures the storage system 170 to execute are illustrated in FIGS. 7, 12, and 13 which are described further below. As shown, the data marker 502 includes elements configured to determine location identifiers within the data to serve as markers used during subsequent de-duplication processing. In some examples, the data marker 502 is configured to mark, e.g. record, a location identifier when the data at or near the location possesses some predetermined characteristic. Thus, in these examples, the data marker 502 is determinative in that it will consistently produce location identifiers at the same locations within a given set of data.

In at least one example, the data marker 502 implements a rolling XOR hash to produce location identifiers. In this example, the data marker 502 is configured to read a parameter (referred to as the "tickhashlength" parameter) that specifies an amount of data (for example, a number of bytes) over which to calculate the XOR hash. In one example, the tickhashlength is specified as a number of sequential bytes. Further, according to this example, the data marker 502 is configured to read through the data, calculating the rolling XOR hash for each sequential region of data having a size of tickhashlength. Thus, in this example, the data marker 502 calculates the rolling XOR hash through a window of data that has a size of tickhashlength and that increments through the data byte by byte. According to this example, the data marker 502 is configured to record a location identifier when the lower 11 bits of the XOR hash have a value of 1. Thus, given a set of randomly distributed data, this particular example of the data marker 502 should, on average, generate a location identifier once every 2048 bytes. In various examples, the data marker 502 is configured to provide the location of the location identifier (for example, an offset into a particular set of data) to the fingerprint generator 504 which is discussed further below.

In other examples, the data marker 502 is configured to monitor a tick rate (i.e. the number of location identifiers found per the amount of data inspected) or another metric that indicates the frequency with which location identifiers are found. In these examples, when the tick rate transgresses a predetermined threshold value, the data marker 502 adjusts the predetermined characteristics or other criteria required to produce a location identifier in a manner suitable to change the tick rate. For instance, in one example, if the tick rate falls below 1 location identifier per every 8192 bytes reviewed, the data marker 502 is configured to alter its behavior to record a location identifier when the lower 10 bits (rather than the lower 11 bits) of the XOR hash have a value of 1, thereby doubling the probability of finding a location identifier in future processing.

Other examples adjust the criteria for finding a location identifier differently and examples are not limited to a particular set of criteria, threshold values or manner of criteria adjustment. For instance, in one example, the data marker 502 is configured to decrease the probability of finding a location identifier if the tick rate crosses another threshold value. In this example, the data marker 502 is configured to increase the number of bits evaluated to generate a location identifier, for example, to the lower 12 bits of the XOR hash value.

Figure 8:
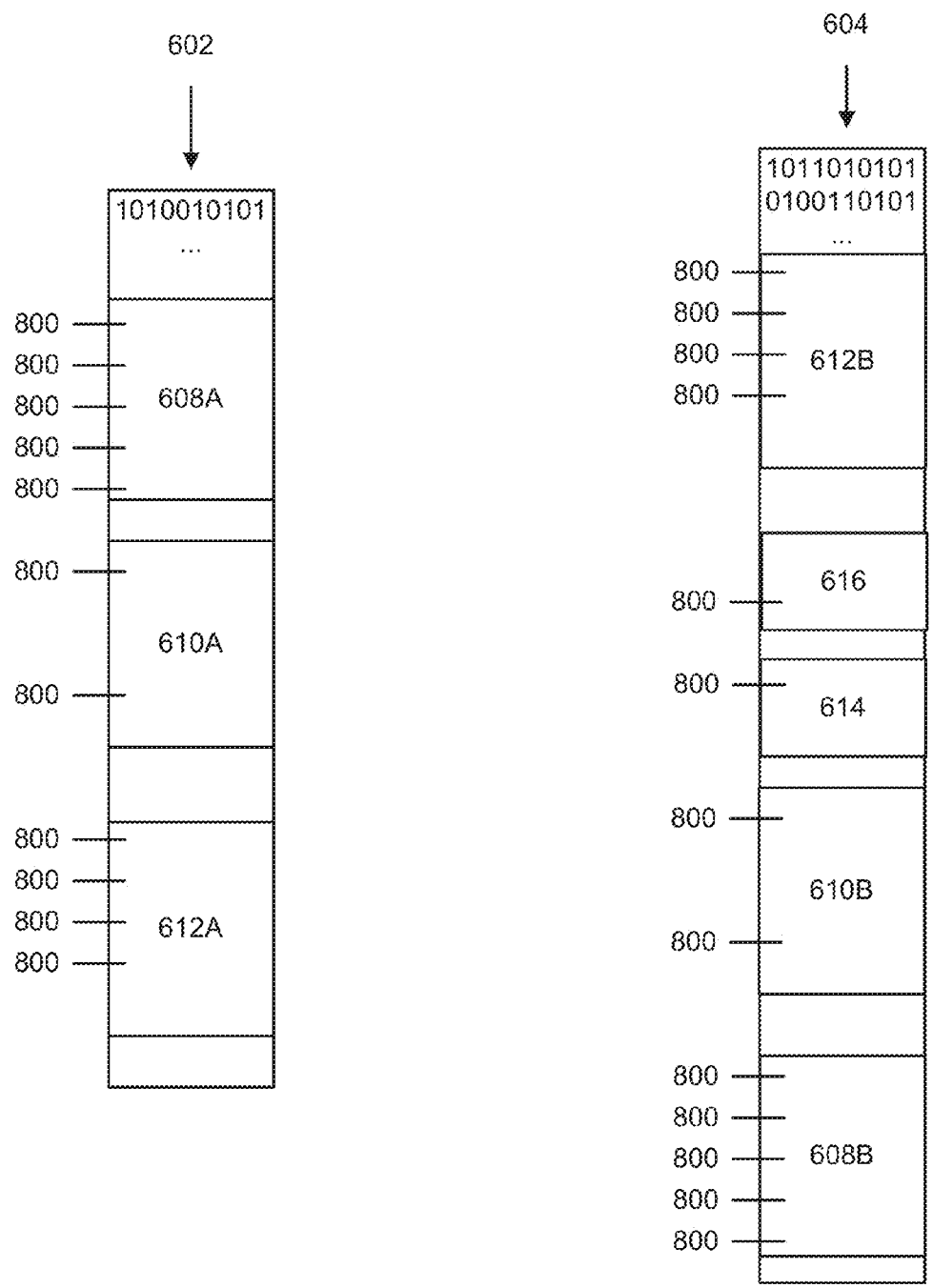
FIG. 8 is a schematic layout of another example of two data sets used in de-duplication processing.

FIG. 8 illustrates the data sets 602 and 604 after the process defined by the data marker 502 has been executed on both data sets. As illustrated, the data marker 502 has located several location identifiers 800 within the target windows and reference potions shown. In addition, as illustrated, the target windows 608A, 610A and 612A have the same number of location identifiers located at the same positions as the reference regions 608B, 610B and 612B, respectively. This demonstrates the data driven determinative nature of the data marker 502.

According to a variety of examples, the fingerprint generator 504 includes elements configured to generate fingerprints (for example, micro-fingerprints) for portions of data (sometimes referred to as navigation windows) that include a multiple number of location identifiers. As will be discussed below, the micro-fingerprints are used to determine if a set of data might include data that is redundant with another set of data. In some examples, the fingerprint generator 504 is configured to store weak hash value pairs that are associated with location identifiers falling with a particular navigation window. These weak hash value pairs may have been generated by a weak hash function, i.e. a computationally efficient hash function. In these examples, the fingerprint generator 504 is configured to select and store the weak hash value pairs that match a set of predefined criteria. Processes that the fingerprint generator 504 configures the storage system 170 to execute are illustrated in FIGS. 9, 12, 13, 15, 16, and 17, which are described further below.

In some examples, the fingerprint generator 504 is configured to characterize the portions of data disposed after the location identifiers. As is discussed further below, in some of these examples, these characterizations are used to build fingerprints that characterize navigation windows within target data and reference data. In at least one example, the characterization takes the form of a weak hash value. In this example, the fingerprint generator 504 is configured to read a parameter (referred to as a "weakhashsize") that specifies an amount of data over which to calculate the weak hash value. Moreover, according to this example, the fingerprint generator 504 is configured to generate a weak hash value using an amount of data located after each location identifier having a size equal to the weakhashsize parameter. In this example, the fingerprint generator 504 is further configured to pair this weak hash value with a weak hash value associated with the previous location identifier (if such exists) and associate this weak hash value pair with the navigation window.

Continuing with this example, the fingerprint generator 504 is configured to store, for each navigation window, a set of weak hash value pairs in a micro-fingerprint. In various examples, the fingerprint generator 504 may be configured to prioritize weak hash value pairs for inclusion and storage in micro-fingerprints based on a variety of attributes. For instance, in some of these examples, the fingerprint generator 504 may be configured to prioritize weak hash value pairs based on the values included within each pair. Thus, in these examples, the fingerprint generator 504 may prioritize weak hash value pairs that include the highest weak hash values, the lowest weak hash values, the weak hash value pairs that have the highest average value, or the weak hash value pairs that have the lowest value or the weak hash values that are the closest in value, among other prioritization schemes.

According to another example, the fingerprint generator 504 is configured to store, for each data set, a set of weak hash value pairs in a prioritized set of summaries. One example of this prioritized set of summaries is referred to as a "macro-fingerprint." The set of weak hash value pairs may be selected from one or more weak hash value pairs stored in one or more predefined sets of summaries, such as micro-fingerprints associated with navigation windows within the data set or macro-fingerprints associated with identified data sets. In various examples, the fingerprint generator 504 may be configured to prioritize weak hash value pairs for inclusion and storage in macro-fingerprints based on a variety of attributes. For instance, in some of these examples, the fingerprint generator 504 may be configured to prioritize weak hash value pairs based on the values included within each pair. Thus, in these examples, the fingerprint generator 504 may prioritize weak hash value pairs that include the highest weak hash values, the lowest weak hash values, the weak hash value pairs that have the highest average value, or the weak hash value pairs that have the lowest value or the weak hash values that are the closest in value, among other prioritization schemes.

In another example, the fingerprint generator 504 is configured to read a parameter (referred to as a "navigation-samples" parameter) that specifies the maximum number of elements of the set of weak hash value pairs to include in the micro-fingerprint for a navigation window. According to this example, the fingerprint generator 504 is configured to scan weak hash value pairs associated with each navigation window. Additionally, in this example, the fingerprint generator 504 is configured to build, for each navigation window, a set of weak hash value pairs based on a particular prioritization scheme (for example, those pairs that include the highest weak hash values compared to other weak hash values associated the navigation window). Further, according to this example, the fingerprint generator 504 is configured to restrict the number of elements of the micro-fingerprint set to be no more than the number specified by the navigationsamples parameter. Moreover, in this example, the fingerprint generator 504 is configured to record, within the logical metadata cache 508, the resulting set of weak hash value pairs as the micro-fingerprint associated with each examined portion.

In another example, the fingerprint generator 504 is configured to read a parameter (referred to as a "macroFPsize" parameter) that specifies the maximum number of elements of the set of weak hash value pairs to include in the macro-fingerprint for a data set. According to this example, the fingerprint generator 504 is configured to scan weak hash value pairs associated with each navigation window within a data set. Additionally, in this example, the fingerprint generator 504 is configured to build, for each data set, a set of weak hash value pairs based on a particular prioritization scheme (for example, those pairs that include the highest weak hash values compared to other weak hash values associated with navigation windows within the data set). Further, according to this example, the fingerprint generator 504 is configured to restrict the number of elements of the macro-fingerprint set to be no more than the number specified by the macroFPsize parameter. Moreover, in this example, the fingerprint generator 504 is configured to record, within the logical metadata cache 508, the resulting set of weak hash value pairs as the macro-fingerprint associated with each examined portion.

It is to be appreciated that the characteristics of fingerprints, such as the maximum number of elements included in the fingerprints and the amount of data described by the fingerprints, have a direct impact on the effectiveness of the de-duplication process. For example, where the data to be de-duplicated is multiplexed data, decreasing the amount of data described by the fingerprints increases the effectiveness of the de-duplication process. However, where the data to be de-duplicated is does not include multiplexed data, increasing the amount of data described by the fingerprints increases the efficiency of the de-duplication process without decreasing its effectiveness to an unacceptable level.

Thus some examples include navigationlength and datasetlength parameters that enable configuration of the amount of data described by micro-fingerprints and macro-fingerprints, respectively. These parameters, in conjunction with the navigationsamples and macroFPsize parameters, enable the storage system software 112 to be configured to utilize fingerprints of varying size and scope to accommodate data having various attributes. For example, the storage system software 112 can be configured to create micro-fingerprints having 7 hash value pairs that describe 7 megabytes of data, 3 hash value pairs that describe 64 kilobytes of data, 7 hash value pairs that describe 512 kilobytes of data, 7 hash value pairs that describe 1 megabyte of data, 7 hash value pairs that describe 50 megabytes of data, 7 hash value pairs that describe 125 megabytes of data. The values of the navigationlength, datasetlength, navigationsamples, and macroFPsize parameters may be adjusted over time to calibrate the storage system software 112 to an acceptable performance level of de-duplication processing.

As discussed above, in this example, the fingerprint generator 504 creates fingerprints that are sets with elements that are pairs of weak hash values. In other examples, the fingerprint generator 504 creates fingerprints that are sets with elements that are themselves sets other than pairs. In these examples, the elements of a fingerprint may be a single element set or multiple element sets and examples are not limited to a particular number of members within each element of a fingerprint. In addition, according to some examples, the fingerprint generator 504 calculates hash values with hash functions other than weak hash functions. While in other examples, the fingerprint generator 504 employs different hash functions for different location identifiers. Thus examples are not limited to a particular hash function or set of hash functions.

In various examples, the navigator 510 includes elements configured to compare fingerprints associated with different areas of data, such as different navigation windows or data sets. In these examples, the navigator 510 uses the result of this comparison to determine where the different areas may contain a sufficient amount of redundant data to warrant further de-duplication processing. In some examples, the navigator 510 is configured to assess the amount of redundant data by comparing the weak hash value pairs included in the fingerprints of both areas. Processes that the navigator 510 configures the storage system 170 to execute are illustrated in FIGS. 10, 14, 15, 18, and 25 which are described further below.

For instance, in some examples, the navigator 510 is configured to determine if reference data has one or more potential matches with one or more target data sets. In this example, the navigator 510 is configured to load macro-fingerprints associated with the reference data into a navigation table, such as a hash table. According to these examples, the navigator 510 is configured to search the navigation table for macro-fingerprints that are associated with one or more target data sets disposed within target data (e.g., data from a plurality of previous back-ups). In at least one example, the navigator 510 can record the number of target data sets that have more than a threshold number of macro-fingerprint elements that match the macro-fingerprint elements associated with the reference data. In one example, the threshold number is one, but other examples may use other threshold numbers to determine if a target data set has a potential match within the reference data.

According to some examples, the navigator 510 is configured to determine if a reference data set has one or more potential matches with one or more target data sets. In this example, the navigator 510 is configured to load micro-fingerprints associated with the reference data set into a navigation table, such as a hash table. According to these examples, the navigator 510 is configured to search the navigation table for micro-fingerprints that are associated with one or more navigation windows disposed within one or more target data sets. In at least one example, the navigator 510 can record the number of target navigation windows that have more than a threshold number of micro-fingerprint elements that match the micro-fingerprint elements associated with the reference data set. In one example, the threshold number is one, but other examples may use other threshold numbers to determine if a target navigation window has a potential match within the reference data set.

Also, in at least one example, the navigator 510 is configured to read a parameter (referred to as the "macronavigationhitmetric" parameter) that specifies a value of a metric used to determine whether a target data set has sufficient match potential with the reference data to warrant further de-duplication processing. In some examples, to determine whether the target data set has sufficient match potential with the reference data to warrant further processing, the navigator 510 evaluates a function of the number of potential matches the target data set has with the reference data. In at least one of these examples, the navigator 510 computes a match potential ratio equal to the number of potential matches within the target data set divided by the number of bytes of data included in the target data set. In this example, the navigator 510 is configured to determine that the reference data has sufficient match potential with the target data set to warrant further processing if the match potential ratio equals or exceeds the macronavigationhitmetric parameter. In another of these examples, the navigator 510 is configured to compute match potential ratios for each of a plurality of target data sets and select a subset of the target data sets having a cardinality equal to the navigationhitmetric and including, as members, the target data sets corresponding to the highest match potential ratios. In some examples, the navigator 510 is configured to make this determination for each of a plurality of target data sets prior to comparing the plurality of target data sets to other reference data.

Also, in another example, the navigator 510 is configured to read a parameter (referred to as the "navigationhitmetric" parameter) that specifies a value of a metric used to determine whether a particular target data set has sufficient match potential with the reference data set to warrant further de-duplication processing. In some examples, to determine whether the target data set has sufficient match potential with the reference data set to warrant further processing, the navigator 510 evaluates a function of the number of target navigation windows (located within a target data set) that have a potential match within the reference data set. In at least one of these examples, the function evaluated by the navigator 510 computes a match potential ratio equal to the number of target navigation windows that have a potential match within the reference data set divided by the number of bytes of data included in the target data set. In this example, the navigator 510 is configured to determine that the reference data set has sufficient match potential with the target data set to warrant further processing if the match potential ratio equals or exceeds the navigationhitmetric parameter. In another of these examples, the navigator 510 is configured to compute match potential ratios for each of a plurality of target data sets and select a subset of the target data sets having a cardinality equal to the navigationhitmetric and including, as members, the target data sets corresponding to the highest match potential ratios. In some examples, the navigator 510 is configured to make this determination for each of a plurality of target data sets prior to comparing the plurality of target data sets to other reference data sets.

In some examples, the navigator 510 is configured to further refine the match potential associated with target data based on indications that the target data is stored in an order that mimics the reference data. For instance, in one example, the navigator 510 compares two or more fingerprints that characterize the target data with two or more matching fingerprints that characterize the reference data. These fingerprints may include macro-fingerprints or micro-fingerprints. Where the navigator 510 detects that some of the fingerprints that characterize the target data follow an order that is similar to the fingerprints that characterize the reference data, the navigator 510 increases the match potential associated with the target data sections characterized by the fingerprints. In some embodiments, the navigator 510 increases the match potential by an amount that is directly related to the degree of similarity between the order of the fingerprints. One example of a fingerprint pattern matching process that the navigator 510 configures the storage system 170 to execute according to these examples is described further below with reference to FIGS. 21-23.

In other examples, the navigator 510 is configured to determine an initial location and size for swaths in reference data sets and target data sets that have sufficient match potential. In these examples, the navigator 510 is configured to use the navigation table to find navigation windows within reference data sets that have sufficient match potential with one or more target navigation windows and to assess the quality of the reference navigation windows as a potential reference swath. According to one example, the navigator 510 is configured to determine the quality of a reference navigation window by determining the number of potential micro-fingerprint element matches that the reference navigation window has with one or more target navigation windows. In this example, the navigator 510 is configured to find potential matches by looking up (in the navigation table) weak hash value pairs associated with the micro-fingerprint of one or more target navigation windows and tracking which reference navigation window includes a matching weak hash value pair. According to this example, the navigator 510 is configured to assess the quality of a reference navigation window in direct relation to the number of potential matches, i.e. more potential match equates to higher quality. By using the navigation table loaded with micro-fingerprints that span the entire reference data set, the navigator 510 is able to locate potential matches for the target navigation window regardless of the location of the matching data within the reference data set relative to other data. In other examples, the navigator 510 may further refine its assessment of the quality of the reference navigation window by adjusting the assessment using a fingerprint pattern matching process, such as the fingerprint pattern matching process described further below with reference to FIGS. 21-24.

In some examples, the navigator 510 is configured to inspect reference navigation windows that neighbor a particular reference navigation window when assessing the quality of the particular reference navigation window. In these examples, the navigator 510 is configured to not only assess the number of potential matches within the particular reference navigation window, but to also to assess the number of potential matches within reference windows that are either adjacent or near to the particular reference navigation window. Further, according to these examples, the navigator 510 is configured to rate the particular reference navigation window as higher quality if the reference navigation windows that neighbor the particular reference navigation window have micro-fingerprint element matches with one or more target navigation windows. In one example, a reference navigation window is considered to be near to (or neighbor) another reference navigation window if no more than a predefined amount of data (for example, one navigation window) is positioned between the two, however examples are not limited to a particular amount of intervening data. This approach has the effect of identifying, as high quality reference navigation windows, areas of the reference data set with a relatively high density of micro-fingerprint element matches to one or more target data sets. The navigator 510 may further refine its assessment of the quality of the reference navigation window by adjusting the assessment using a fingerprint pattern matching process that operates on reference navigation windows that neighbor the reference navigation window (alone or in combination with other navigation windows), such as the fingerprint pattern matching process described further below with reference to FIGS. 21-24.

According to some examples, the navigator 510 is configured to initially position the reference swath over the highest quality reference navigation window and to position the target swath relative to the one or more target navigation windows with the most corresponding (and, in some embodiments, similarly ordered) potential matches.

In some examples, the navigator 510 is configured to adjust the characteristics of the target and reference swaths to enable de-duplication of additional data. For instance, in some examples, the navigator 510 is configured to determine if increasing the size of the swaths by a predefined amount would likely result in the discovery of additional redundant data. According to one example, the navigator 510 is configured to identify target navigation windows located outside, but near, the target swath and to determine if the micro-fingerprint associated with the target navigation windows matches to the micro-fingerprint of a reference navigation window near, or inside, the reference swath. The navigator 510 may also be configured to determine whether the matching micro-fingerprint maintains a degree of similarity between the fingerprints that characterize data within the target and reference swaths according to the fingerprint pattern matching process described below with reference to FIGS. 21-24. In this example, the navigator 510 is configured to continue seeking matches for micro-fingerprints associated with target navigation windows near the target swath and reference navigation windows near the reference swath until some predetermined number of failures to match occurs (for example, two sequential failures, the degree of similarity between the target and reference swaths is not maintained, etc.) or until growth of the swaths (target and reference) to include additional data would cause either swath to exceed a maximum swath size parameter.

In summary, according to various examples, the navigator 510 is configured to navigate to areas of redundant data contained within two or more sets of data and position swaths relative to those areas. In these examples, the navigator 510 can navigate data regardless of the source of the fingerprints (micro or macro) that characterize the data (including, for example, data that has not been prepared using the data marker 502). As discussed, in these examples, the navigator 510 is configured to utilize prioritized sets of data summaries (such as hash values) that are included within macro-fingerprints and micro-fingerprints to identify potentially redundant areas of data, even if those areas are located in different positions within the two or more sets of data. In addition, while in some examples the navigator 510 is configured to position a single target swath and a single reference swath, in other examples the navigator 510 is configured to position one or more target swaths and one or more reference swaths. Thus examples disclosed herein are not limited by the number of swaths implemented by the navigator 510 nor by the number of reference data sets or target data sets processed.

In some examples, the navigator 510 is configured to compare fingerprints having dissimilar sizes (numbers of elements in the fingerprints) or scopes (amounts of data described by the fingerprint) by generating one or more simulated fingerprints. In these examples, the navigator 510 first aggregates a plurality of the fingerprints having smaller scope into a first simulated fingerprint having a scope of a size equal to the least common multiple of the dissimilar scopes. Next, the navigator 510 aggregates a plurality of the fingerprints having larger scope into a second simulated fingerprint having a scope of a size equal to the least common multiple of the dissimilar scopes. The navigator 510 continues by reprioritizing and limiting the number of elements included in the simulated fingerprint having larger size to a number of elements included in the simulated fingerprint having smaller size. Upon completion of this process, the navigator 510 may compare the first simulated fingerprint to the second simulated fingerprint.

Figure 15:
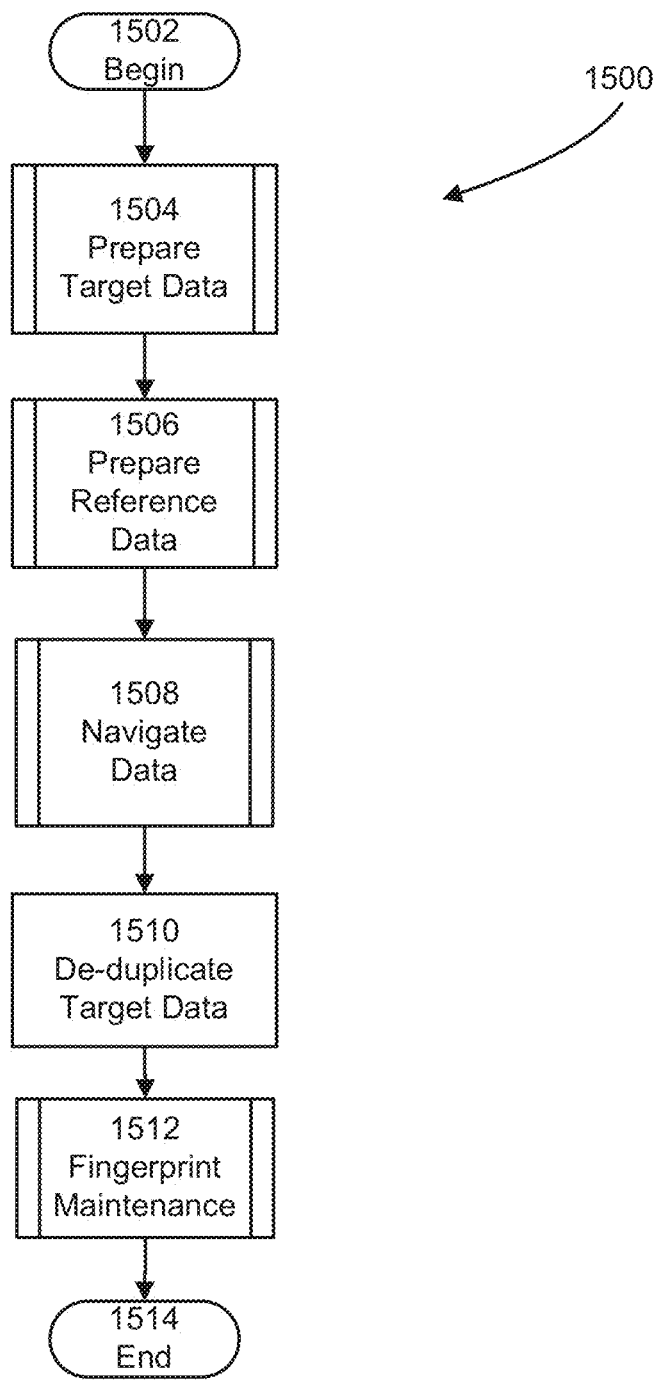
FIG. 15 is a flow diagram of another method for de-duplicating data objects.
Figure 19:
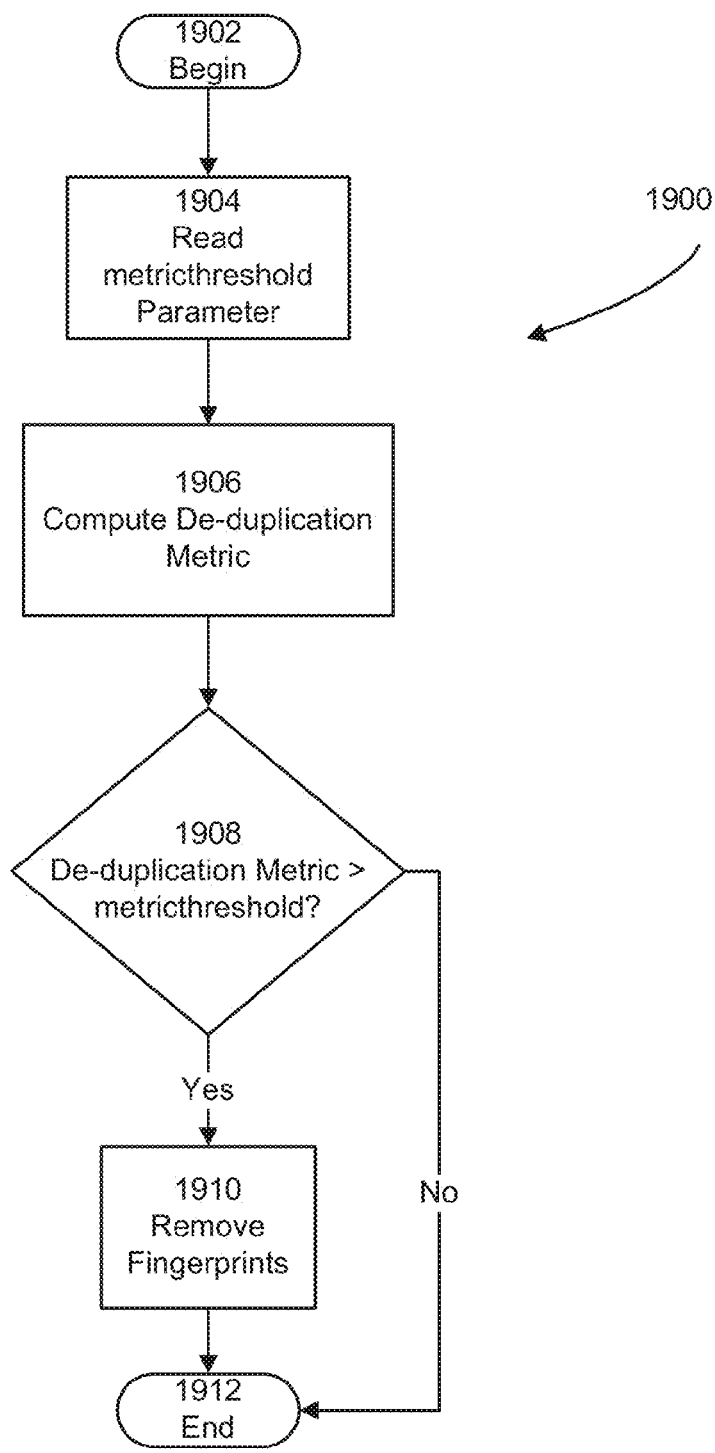
FIG. 19 is a flow diagram of a method for maintaining fingerprints.

In various examples, the fingerprint auditor 512 includes elements configured to maintain fingerprints associated with target data. According to some of these examples, the fingerprint auditor 512 computes a de-duplication metric for the target data characterized by each micro-fingerprint. This de-duplication metric may indicate an amount of redundant data removed from the target data via de-duplication processes. Where the de-duplication metric exceeds a threshold value (e.g., the amount of redundant data removed exceeds a threshold amount), the fingerprint auditor 512 removes the micro-fingerprint that characterizes the data that is the basis for the de-duplication metric. Where the removed micro-fingerprint shares one or more value sets with a macro-fingerprint, the fingerprint auditor 512 removes the one or more value sets from the macro-fingerprint as well, as a sufficient amount of the redundant target data characterized by the one or more value sets has been removed and further de-duplication processing of the one or more value sets would provide little value. Processes that the fingerprint auditor 512 configures the storage system 170 to execute are illustrated in FIGS. 15 and 19, which are described further below.

According to some examples, the delta differencer 506 includes elements configured to conduct a byte-for-byte de-duplication process of the target swath with reference to the reference swath. In these examples, the delta differencer 506 removes redundant data by replacing redundant data in the target data with indicators to the redundant data in the reference data.

Figure 11:
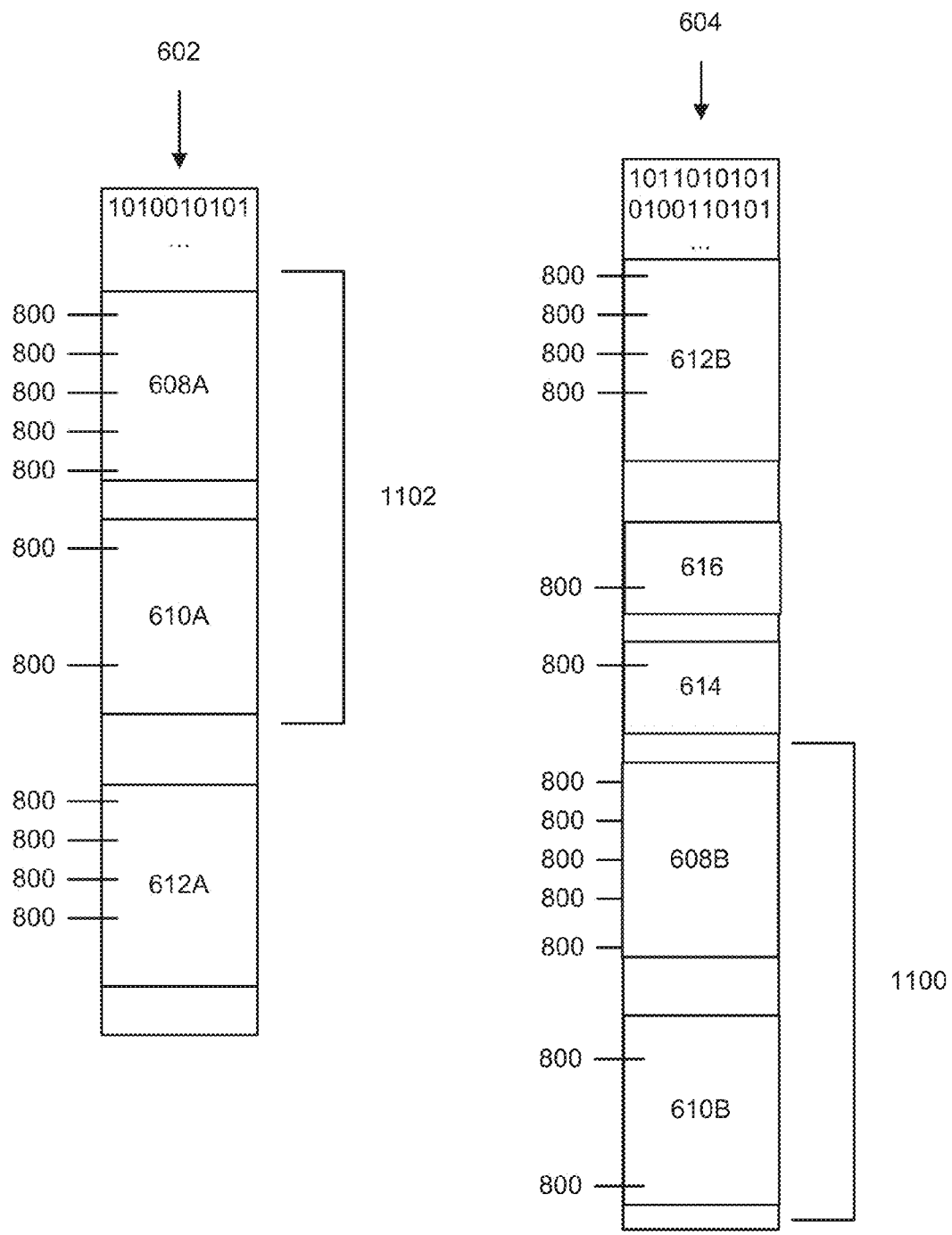
FIG. 11 is a schematic layout of another example of two data sets used in de-duplication processing.

FIG. 11 illustrates the data sets 602 and 604 prior to execution of the byte by byte de-duplication process. FIG. 11 also illustrates a swath 1100, positioned and sized to include the reference region 608B, and a region of target data 1102 which includes the target window 608A. In this example, the storage system 170 is configured to begin byte by byte de-duplication of the target region 1102 using the swath 1100 as a reference.

As discussed above, in some examples, the components 502, 504, 506 and 510 each read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

In other examples, the storage system software 112 may include de-duplication software such as that disclosed in U.S. patent application Ser. No. 12/355,188, entitled "SCALABLE DE-DUPLICATION MECHANISM" and filed on Jan. 16, 2009 which is hereby incorporated by reference in its entirety. In these examples, the storage system software 112 may include a de-duplication director that is configured to direct data to one of a plurality of de-duplication domains based on the characteristics of the data or the presence or absence of specific metadata values associated with the data. According to these examples, the de-duplication techniques employed by the components 502, 504, 506 and 510 may be included in particular de-duplication domains and thus be a subset of the overall de-duplication techniques implemented within the storage system software 112. Thus, as discussed above, examples are not limited to a particular type of data de-duplication.

De-Duplication Processes

Various examples provide processes for de-duplicating data using a computer system specially configured to perform the functions disclosed herein. As discussed above with regard to act 204 shown in FIG. 2, various examples provide processes for preparing target data for de-duplication. FIG. 12 illustrates one such process 1200 that may be used to implement act 204 and that includes acts of marking, e.g. recording, location identifiers in the target data and fingerprinting the target data. Process 1200 begins at 1202.

In act 1204, a computer system delineates, or marks, the target data. In one example, the computer system that marks the target data is arranged and configured to execute a data marker 502 as described above with regard to FIG. 5. In this example, the data marker 502 identifies locations within the target data that match predefined criteria and provides location identifiers that identify these locations to the fingerprint generator 504.

FIG. 7 illustrates one example process 700 in accord with act 1204. Process 700 begins at 702. In act 704, a computer system reads the tickhashlength parameter. In act 706, the computer system moves the rolling window by one byte and reads an amount of data equal to the tickhashlength parameter. In act 708, the computer system calculates an XOR hash of this data. In act 710, the computer system determines if the hash meets the predetermined criteria for establishing a location identifier. If so, the computer system records the location identifier in act 712. If not, the computer system determines if the there is more data to process in act 714. If so, the computer system proceeds to act 706. If not, the computer system proceeds to act 716. Process 700 ends at 716.

In act 1206, a computer system fingerprints the target data. In one example, the computer system that performs this comparison is arranged and configured to execute a fingerprint generator 504 as described above. In this example, the fingerprint generator 504 determines, for each target window, a set of weak hash value pairs that include higher weak hash values than other weak hash value pairs associated with location identifiers that fall within the target window. Also, in this example, the fingerprint generator 504 stores the generated fingerprint in the logical metadata cache 508.

Figure 9:
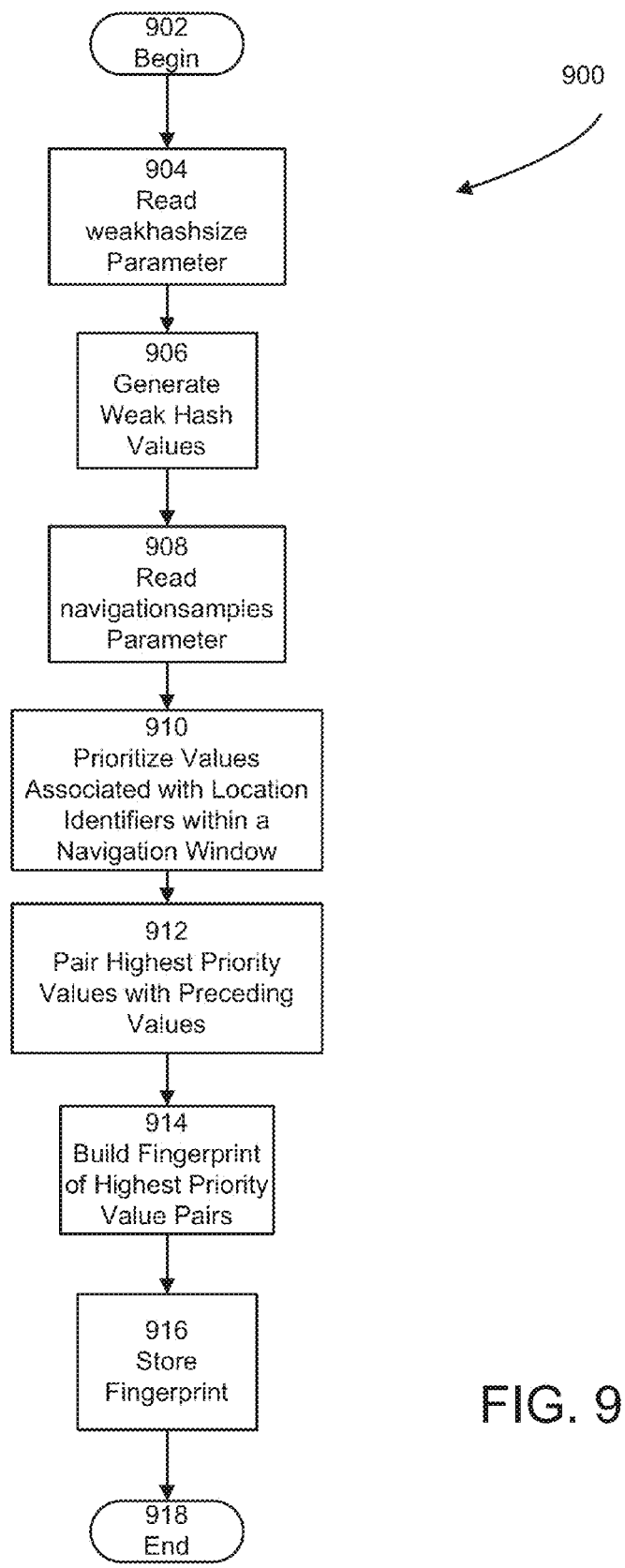
FIG. 9 is a flow diagram of a method for fingerprinting data.

FIG. 9 illustrates one example process 900 in accord with act 1206. Process 900 begins at 902. In act 904, a computer system reads the weakhashsize parameter. In act 906, the computer system calculates a weak hash value for data subsequent to each location identifier within a navigation window being fingerprinted. In act 908, the computer system reads the navigationsamples parameter. In act 910, the computer system prioritizes the weak hash values associated with location identifiers in the navigation window. In one example, the weak hash values are placed in a list of descending order according to value. In act 912, the computer system identifies a predefined number of the highest priority weak hash values from the ordered list. In this example, the number of identified weak hash values does not exceed the navigationsamples parameter. Also in act 912, the computer system pairs each identified weak hash value with the weak hash value associated with the location identifier that precedes the location identifier associated with each identified weak hash value (if such exists). In act 914, the computer system builds a fingerprint for the navigation window that includes the highest weak hash value pairs. In act 916, the computer system stores the fingerprint in the logical metadata cache 508. Process 900 ends at 918.

Process 1200 ends at 1208. Rather than establishing a rigid framework within the data used to perform de-duplication, examples in accord with process 1200 prepare the data using a flexible, data driven approach. This data driven approach is more efficient than conventional approaches because it focuses on the areas of data that are most likely to include redundant data.

As discussed above with regard to act 206 shown in FIG. 2, various examples provide processes for preparing reference data for de-duplication. FIG. 13 illustrates one such process 1300 that may be used to implement act 206 and that includes acts of marking the reference data and fingerprinting the reference data. Process 1300 begins at 1302.

In act 1304, a computer system delineates, or marks, the reference data. In one example, the computer system that marks the reference data is arranged and configured to execute a data marker 502 as described above with regard to FIG. 5. In this example, the data marker 502 identifies locations within the reference data that match predefined criteria and provides location identifiers that identify these locations to the fingerprint generator 504.

FIG. 7 illustrates one example process 700 in accord with act 1304. Process 700 begins at 702. In act 704, a computer system reads the tickhashlength parameter. In act 706, the computer system moves the rolling window by one byte and reads an amount of data equal to the tickhashlength parameter. In act 708, the computer system calculates an XOR hash of this data. In act 710, the computer system determines if the hash meets the predetermined criteria for establishing a location identifier. If so, the computer system records the location identifier in act 712. If not, the computer system determines if the there is more data to process in act 714. If so, the computer system proceeds to act 706. If not, the computer system proceeds to act 716. Process 700 ends at 716.

In act 1306, a computer system fingerprints the reference data. In one example, the computer system that performs this comparison is arranged and configured to execute a fingerprint generator 504 as described above. In this example, the fingerprint generator 504 determines, for each reference portion, a set of weak hash value pairs that include higher weak hash values than other weak hash value pairs associated with location identifiers that fall within the reference portion. Also, in this example, the fingerprint generator 504 stores the generated fingerprint in the logical metadata cache 508.

FIG. 9 illustrates one example process 900 in accord with act 1306. Process 900 begins at 902. In act 904, a computer system reads the weakhashsize parameter. In act 906, the computer system calculates a weak hash value for data subsequent to each location identifier within a navigation window being fingerprinted. In act 908, the computer system reads the navigationsamples parameter. In act 910, the computer system prioritizes the weak hash values associated with location identifiers in the navigation window. In one example, the weak hash values are placed in a list of descending order according to value. In act 912, the computer system identifies a predefined number of the highest priority weak hash values from the ordered list. In this example, the number of identified weak hash values does not exceed the navigationsamples parameter. Also in act 912, the computer system pairs each identified weak hash value with the weak hash value associated with the location identifier that precedes the location identifier associated with each identified weak hash value (if such exists). In act 914, the computer system builds a fingerprint for the navigation window that includes the highest weak hash value pairs. In act 916, the computer system stores the fingerprint in the logical metadata cache 508. Process 900 ends at 918.

Process 1300 ends at 1308. Rather than establishing a rigid framework within the data used to perform de-duplication, examples in accord with process 1300 prepare the data using a flexible, data driven approach. This data driven approach is more efficient than conventional approaches because it focuses on the areas of data that are most likely to include redundant data.

Figure 14:
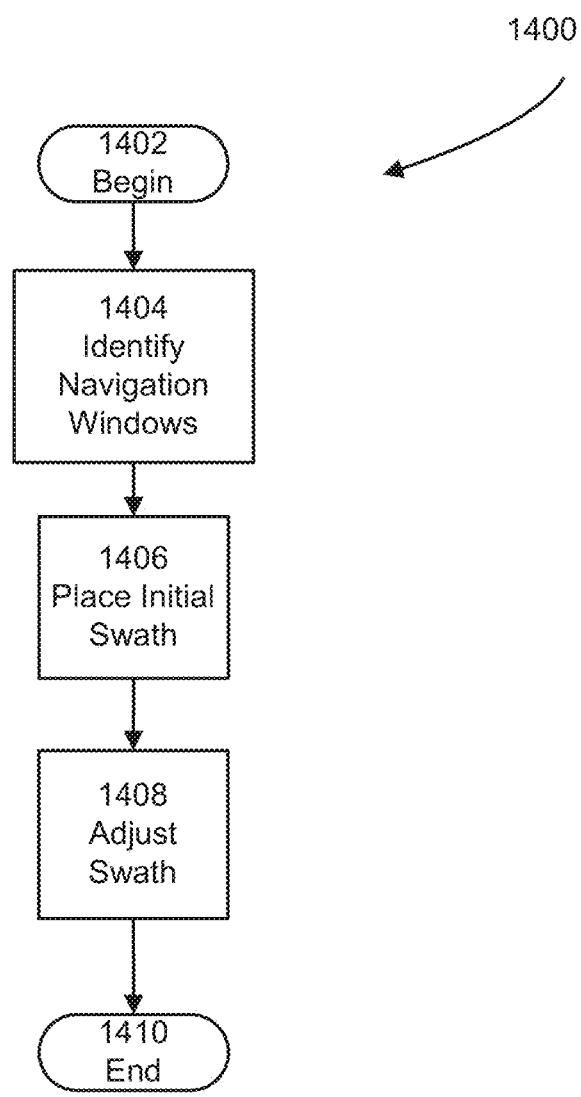
FIG. 14 is a flow diagram of a method for navigating reference data.

As discussed above with regard to act 208 shown in FIG. 2, various examples provide processes for navigating data to determine a satisfactory position for the swaths within the target data and the reference data. FIG. 14 illustrates one such process 1400 that may be used to implement act 208 and that includes acts of identifying navigation windows, placing the swath in relation to the identified navigation windows and adjusting the size of the swath. Process 1400 begins at 1402.

In act 1404, a computer system identifies a reference data set that has sufficient match potential with a target data set. In one example, the computer system that identifies the data sets is arranged and configured to execute a navigator 510 as described above with regard to FIG. 5. In this example, the navigator 510 finds a reference data set that contains a predefined minimum number of potential matches with the target navigation windows included in the target data set. The navigator 510 may find the reference data set and the target data set by computing a match potential ratio equal to the number of target navigation windows that have a potential match within the reference data set divided by the number of bytes of data included in the target data set. As described above, the navigator 510 may also adjust the match potential ratio based on a fingerprint pattern matching process as described below with reference to FIGS. 21-24. Also, in act 1404, the computer system identifies a potentially high quality reference navigation window within the reference data set.

Figure 10:
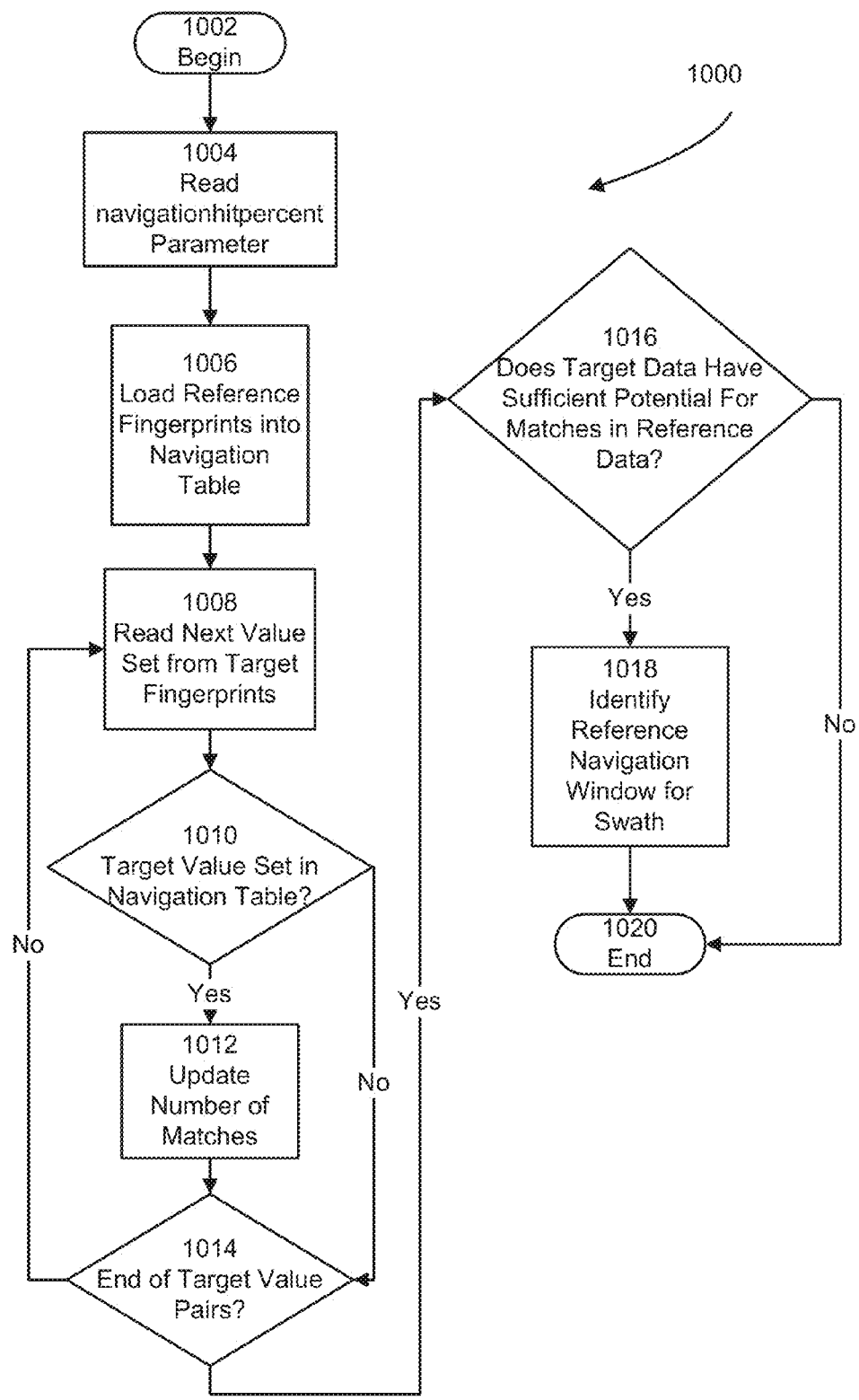
FIG. 10 is a flow diagram of a method for navigating data.

FIG. 10 illustrates one example process 1000 in accord with act 1404. Process 1000 begins at 1002. In act 1004, a computer system reads the navigationhitmetric parameter. In act 1006, the computer system loads the fingerprints associated with a reference data set into a navigation table. The reference data set may include a plurality of reference navigation windows, each with an individual set of weak hash value pairs within its fingerprint. In act 1008, the computer system reads the next value set (for example, a pair of weak hash values) from the fingerprints associated with a target data set. The target data set may include a plurality of target navigation windows, each having an individual set of weak hash value pairs within its fingerprint. In act 1010, the computer system determines if the target value set is in the navigation table. If so, the computer system increments the number of potential matches for that navigation table entry in act 1012. If not, the computer system proceeds to act 1014.

In act 1014, the computer system determines if there are additional target value sets to process. If so, the computer system proceeds to act 1008. If not, the computer system determines if the target data set has sufficient match potential with the reference data set based on the number of target and reference navigation window potential matches and the navigationhitmetric parameter in act 1016 (e.g., by calculating a match potential ratio). In some embodiments, the computer system adjusts the match potential of the target data set based on a fingerprint pattern matching process, such as the fingerprint pattern matching process described below with reference to FIGS. 21-24. It is to be appreciated that the computer system may batch, analyze and adjust the match potential of a plurality of target data sets while executing the act 1016 (e.g., if the computer system is configured to only de-duplicate a predetermined number of target data sets having the highest match potential). If the data sets have sufficient match potential, in act 1018 the computer system identifies a high quality reference navigation window and one or more high quality target navigation windows. In this example, the quality of the reference navigation window is based on the number of value set matches that the reference navigation window has with target navigation windows included in the matching target data set and the number of such matches included in neighboring navigation windows. If the data set do not have sufficient match potential, the computer system progress to act 1020. Process 1000 ends at 1020.

A particular example of the result of act 1404 is illustrated with reference to FIG. 11. After act 1404 is complete, the target areas 608A, 610A and 612A are respectively associated with reference areas 608B, 610B and 612B because each reference area is the best potential match (i.e. has more matching fingerprint weak hash values) for each respective target area. In addition, the target areas 608A and 608B have been identified as the highest quality navigation windows within their respective data sets because of the number of potential matches they share, the number of potential matches found in their neighboring navigation windows (610A and 610B, respectively), and the similarity of the sequence of fingerprints within each and their neighboring navigation windows. The manner in which similarity of fingerprint matches may affect match quality assessment is described further below with reference to FIGS. 21-24.

In act 1406, a computer system positions the swath at a location based on the potential quality of the match between the target window and the reference area. In one example, the navigator 510 positions the swath over a reference area that is associated with the target window undergoing de-duplication processing. For example, a computer system executing act 1406 with reference to target window 608A would initially position the swath over reference area 608B, as shown in FIG. 11.

In act 1408, a computer system adjusts the size of the swaths in an attempt to find additional redundant data outside of the target window and reference area. In one example, the computer system analyzes the effect of increasing the size of the swaths until it determines a swath size such that further growth would not resulting in identification of additional redundant data. Continuing the example illustrated by FIG. 11, the computer system may increase the size of the swath 1100 positioned with reference to reference area 608B. As the size of the swath 608B increases, the swath will first encompass reference area 610B. This reference area is associated with (is a potentially high quality match of) target area 610A due to the values of the fingerprints included in the areas and the order in which the matching fingerprints occur within the areas. Therefore, according to this example, the computer system executing act 1408 would include the reference area 610B in the reference swath 1100 and the target area 610A in the target swath 1102. Also, according to this example, the computer system executing act 1408 would not include reference area 612B in the reference swath 1100 because reference area 612B is too distant and in the wrong direction from reference navigation windows that include reference areas 608B and 610B (i.e. attempts to grow the swath 1100 would result in sequential failures to find target navigation window potential matches corresponding to the navigation windows including reference areas 614 and 616.

Process 1400 ends at 1410. Examples in accord with process 1400 result in target and reference swaths that are properly positioned and sized to produce efficient and effective de-duplication processing. Examples in accord with process 1400 provide for a robust, data driven approach to navigating to redundant data contained within two or more sets of data. Thus, process 1400 can navigate data regardless of the source of the fingerprints that characterize the data and, in some examples, a computer system executes process 1400 on data that has not been prepared using the data marker 502. While process 1400 discloses positioning a single target swath and a single reference swath, examples in accord with process 1400 are not limited to a single target swath or a single reference swath and any number of either may be employed. Moreover, examples are not limited to a single target data set or a single reference data set and a plurality of either or both may be used.

In other examples, a computer system (such as the computer system 102 described above with reference to FIG. 1 or the back-up data storage system 170 described above with reference to FIG. 5) executes data driven de-duplication processes that prepare and navigate fingerprints that characterize differing and at least partially overlapping ranges of data. For instance, in some examples a fingerprint generator, such as the fingerprint generator 504 described above with reference to FIG. 5, prepares a set of micro-fingerprints that characterize regions of data using processes such as the process 900 described above with reference to FIG. 9. Further, in these examples, the fingerprint generator is configured to summarize the micro-fingerprints into macro-fingerprints that characterize data spanning the one or more regions of data characterized by the micro-fingerprints.

Further, according to some examples, a navigator, such as the navigator 510 described above with reference to FIG. 5, navigates to particular regions of data by analyzing both macro-fingerprints and micro-fingerprints. In these examples, the navigator is configured to identify target and reference data that is likely to include redundant data by comparing and matching macro-fingerprints that characterize the target data to macro-fingerprints that characterize the reference data. In these examples, once target and reference data that are likely to include redundant data are identified, the navigator navigates to, and adjusts, particular navigation windows within the target and reference data using processes such as the navigation processes described above with reference to FIGS. 10 and 14.

FIG. 15 illustrates a data driven de-duplication process 1500 in accord with these examples. The data driven de-duplication process 1500 includes acts of preparing data targeted for de-duplication, preparing data to be referenced during the de-duplication of the target data, navigating the reference data, de-duplicating the target data, and maintaining fingerprints. Process 1500 begins at 1502.

In act 1504, target data is prepared for de-duplication. According to various examples, a computer system prepares the target data by generating macro-fingerprints based on previously calculated micro-fingerprints of data located near location identifiers. Acts in accord with these examples are discussed below with reference to FIG. 16.

In act 1506, reference data is prepared for de-duplication. According to various examples, a computer system prepares the reference data by generating macro-fingerprints based on previously calculated micro-fingerprints of data located near location identifiers. Acts in accord with these examples are discussed below with reference to FIG. 17.

In act 1508, target data and reference data is navigated to identify target data with macro-fingerprints that match macro-fingerprints of reference data. Next, the target data and the reference data are navigated to place swaths at locations matching a set of predefined criteria. According to several examples, a computer system positions the swaths relative to one or more regions of data in the target data and the reference data that have matching micro-fingerprints. In some embodiments, the computer system positions the swaths or adjusts the size of the swaths based on a degree to which micro-fingerprints associated with the target data and the reference data follow a common sequence. Acts executed as part of the act 1508 are described below with reference to FIG. 18.

In act 1510, the target data is de-duplicated. According to a variety of examples, a network of computer systems performs a byte-by-byte comparison between the data in the target swath and the data in the reference swath. When a predetermined quantity of redundant data is found, the computer system replaces the redundant data included in target swath with a pointer to the matching data in the reference swath. In other examples, the network of computer systems calculates a hash value for the data in the target swath and the data in the reference swath using a hash function with strong collision resistance. In these examples, the network of computer systems ensures a high probability that both swaths of data are identical prior to replacing the redundant data in the target swath with a pointer to the matching data in the reference swath. Further examples use various data de-duplication techniques known in the art and examples are not limited to a particular de-duplication technique or set of techniques.

In act 1512, the fingerprints that characterize the target data are maintained. According to some examples, a computer system computes a de-duplication metric for the target data characterized by each micro-fingerprint. This de-duplication metric may indicate an amount of target data that has been removed via de-duplication processing. Where the de-duplication metric exceeds a threshold value (e.g., the amount of target data removed via de-duplication processing exceeds a predetermined amount), the computer system removes the micro-fingerprint that characterizes the target data that is the basis for the de-duplication metric. Where the removed micro-fingerprint shares one or more value sets with a macro-fingerprint, the computer system removes the one or more value sets from the macro-fingerprint as well. Acts executed as part of the act 1510 are described below with reference to FIG. 19.

Process 1500 ends at 1514. Data de-duplication activities in accord with process 1500 enable a computer system to effectively de-duplicate vast amounts of data in a highly precise manner.

Figure 16:
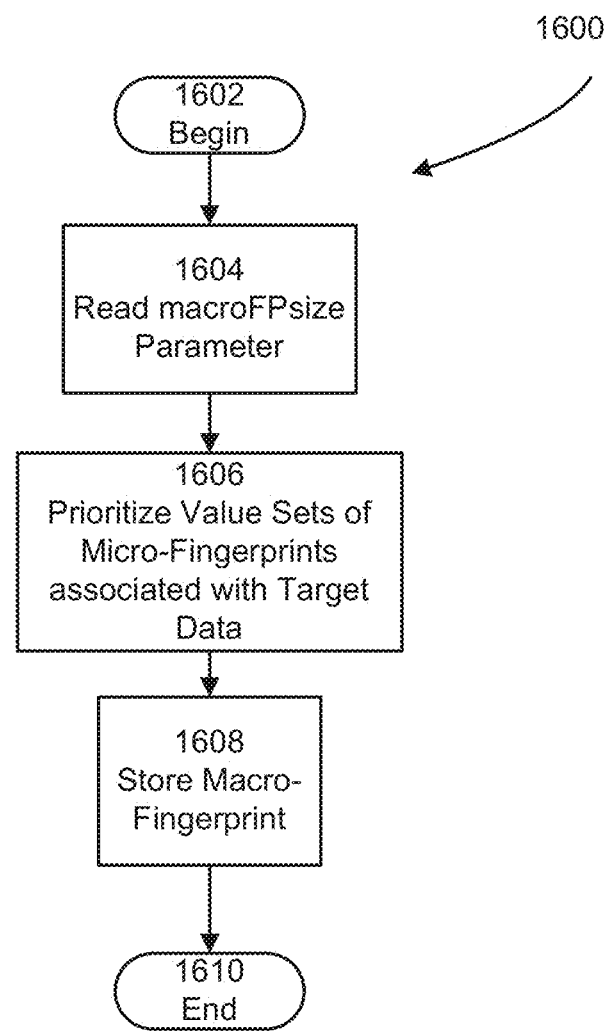
FIG. 16 is a flow diagram of a method for fingerprinting target data.

As described above with reference to the act 1504, some examples prepare target data for de-duplication by generating macro-fingerprints based on previously calculated micro-fingerprints of target data located near the location identifiers. FIG. 16 illustrates one example macro-fingerprinting process 1600 in accord with the act 1504. The macro-fingerprinting process 1600 begins at 1602. In act 1604, a computer system reads the macroFPsize parameter. In at least one example, the macroFPsize parameter specifies a maximum macro-fingerprint size of 7 value pairs. In act 1606, the computer system prioritizes value sets included within micro-fingerprints associated with location identifiers within the target data. The prioritization scheme used in the act 1606 varies between embodiments and may include any of the prioritization schemes described above with reference to the fingerprint generator 504, among other prioritization schemes. In one example, the value sets of the micro-fingerprints are placed in a list of descending order according to value. In act 1608, the computer system identifies a predefined number of the highest priority values sets from the ordered list. In this example, the number of identified micro-fingerprints does not exceed the macroFPsize parameter. Also in the act 1608, the computer system stores the identified value sets as a macro-fingerprint associated with the target data in the logical metadata cache 508.

The macro-fingerprinting process 1600 ends at 1610. Examples in accord with the macro-fingerprinting process 1600 prepare the target data for de-duplication by creating macro-fingerprints that characterize large amounts of target data without requiring a re-read of the target data itself. Therefore, such processes provide for an efficient and effective summary of the target data that can be subsequently used to navigate to portions of the target data likely to include redundant data.

Figure 17:
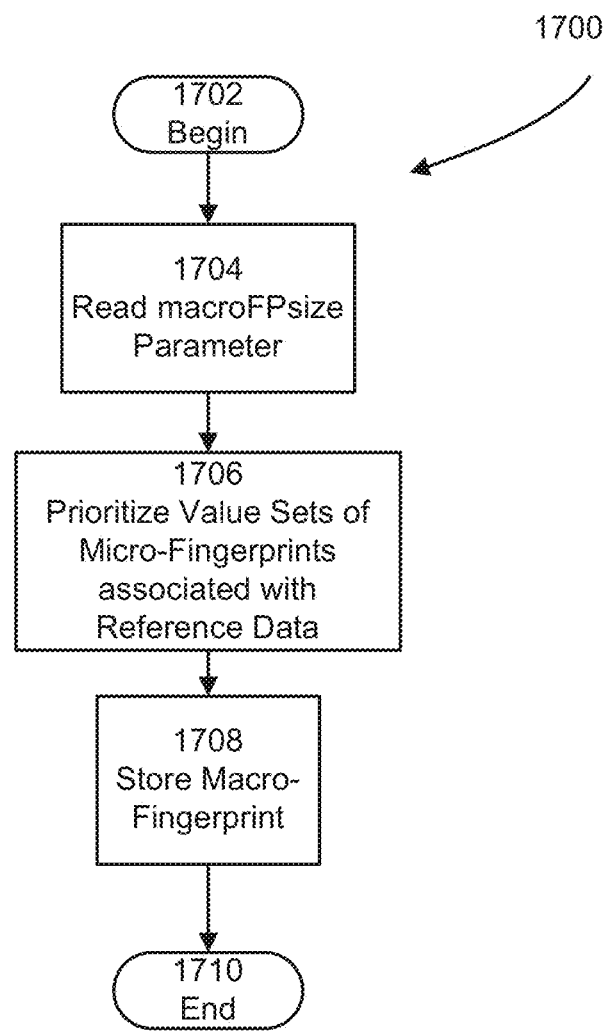
FIG. 17 is a flow diagram of a method for fingerprinting reference data.

As described above with reference to the act 1506, some examples prepare reference data for de-duplication by generating macro-fingerprints based on previously calculated micro-fingerprints of reference data located near the location identifiers. FIG. 17 illustrates one example macro-fingerprinting process 1700 in accord with the act 1506. The macro-fingerprinting process 1700 begins at 1702. In act 1704, a computer system reads the macroFPsize parameter. In at least one example, the macroFPsize parameter specifies a maximum macro-fingerprint size of 7 value pairs. In act 1706, the computer system prioritizes value sets included within micro-fingerprints associated with location identifiers within the reference data. The prioritization scheme used in the act 1706 varies between embodiments and may include any of the prioritization schemes described above with reference to the fingerprint generator 504, among other prioritization schemes. In one example, the value sets of the micro-fingerprints are placed in a list of descending order according to value. In act 1708, the computer system identifies a predefined number of the highest priority values sets from the ordered list. In this example, the number of identified micro-fingerprints does not exceed the macroFP-size parameter. Also in the act 1708, the computer system stores the identified value sets as a macro-fingerprint associated with the reference data in the logical metadata cache 508.

The macro-fingerprinting process 1700 ends at 1710. Examples in accord with the macro-fingerprinting process 1700 prepare the reference data for de-duplication by creating macro-fingerprints that characterize large amounts of reference data without requiring a re-read of the reference data itself. Therefore, such processes provide for an efficient and effective summary of the reference data that can be subsequently used to navigate to portions of the reference data likely to include redundant data.

Figure 18:
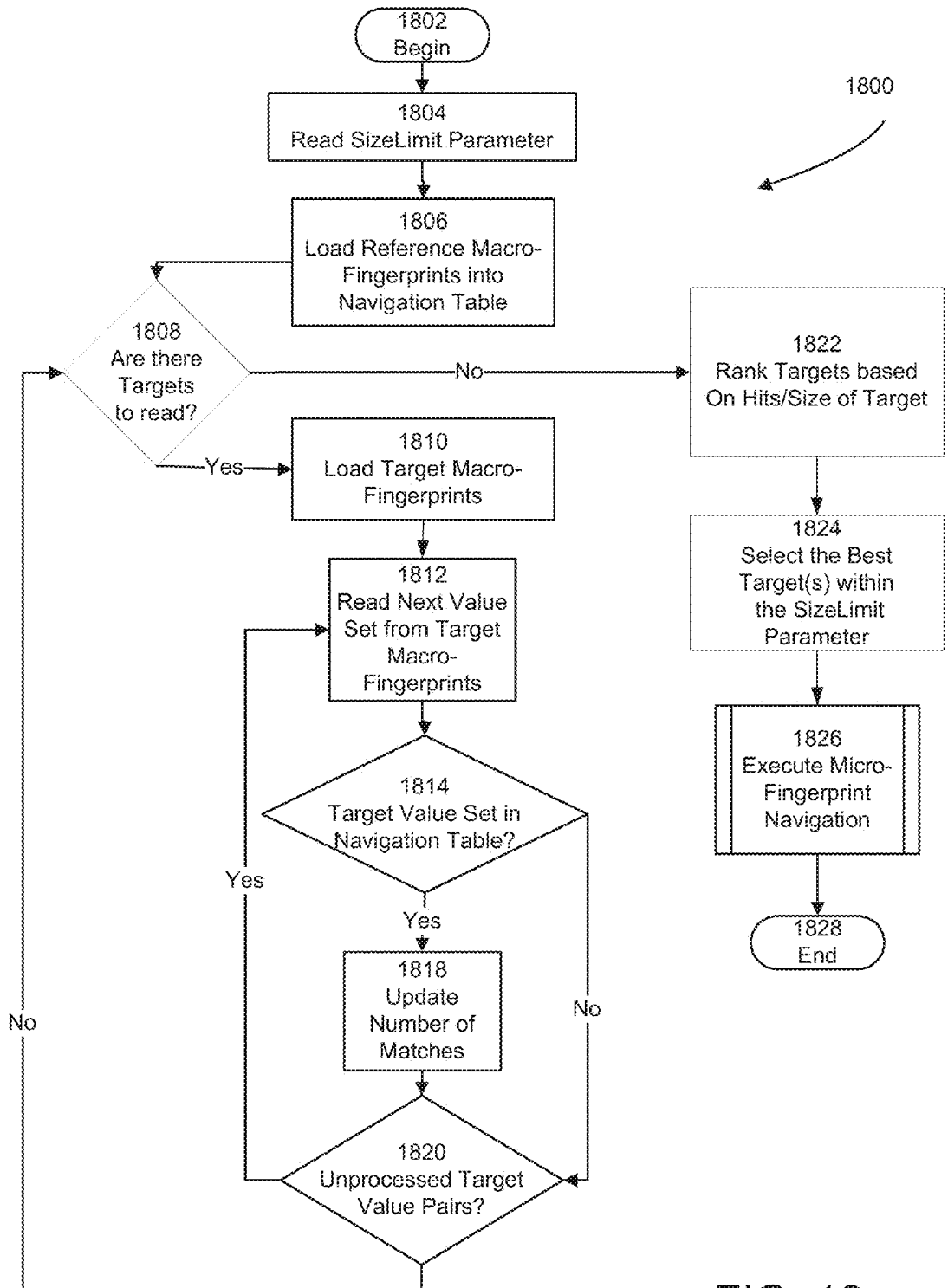
FIG. 18 is a flow diagram of another method for navigating target and reference data.

As described above with reference to the act 1508, some examples navigate data to identify target data with macro-fingerprints similar to macro-fingerprints of reference data. FIG. 18 illustrates one example navigation process 1800 in accord with the act 1508. The navigation process 1800 begins at 1802. In act 1804, a computer system reads the SizeLimit parameter. In act 1806, the computer system loads one or more macro-fingerprints associated with reference data (for example, a most recent backup data set) into a navigation table. The reference data may include a plurality of reference data sets, each with an individual set of micro-fingerprints. In act 1808, the computer system determines whether additional, unprocessed data targeted for de-duplication (e.g. some or all of the data previously backed up using the computer system) exist. The target data may include a plurality of target data sets, each with one or more macro-fingerprints that characterizes its content. If additional, unprocessed data exists, the computer system loads a set of macro-fingerprints associated with the next target data into a memory in act 1810. Otherwise, the computer system executes act 1822.

In act 1812, the computer system reads a next value set from the loaded set of target macro-fingerprints. In act 1814, the computer system determines if the navigation table includes an entry for a reference value set with a value equal to a value of the next value set read in the act 1812. If so, the computer system increments the number of potential matches for that navigation table entry in act 1818. If not, the computer system proceeds to act 1820. In the act 1820, the computer system determines whether the loaded set of target macro-fingerprints includes unprocessed macro-fingerprints. If so, the computer system proceeds to the act 1812. If not, the computer system proceeds to the act 1808.

In the act 1822, the computer system ranks the target data sets based on their match potential metric (e.g., the number of macro-fingerprint hits recorded for a target data set divided by the size of the target data set). In act 1824, the computer system selects the target data set or sets with highest match potential metrics that fit within the SizeLimit parameter. In some embodiments, within the act 1824, the computer system adjusts match potential metrics of the target data set or sets based on fingerprint pattern similarity and proximity to the reference data set or sets. In these embodiments, the computer system may filter through data sets having large numbers of matching fingerprints to de-duplicate areas having matching fingerprints in close proximity and following similar sequences. Examples of adjusting match potential metrics in this way are described further below with reference to FIGS. 21-24.

In act 1826, the computer system records the reference data as high quality reference data, records the target data as high quality target data and executes a micro-fingerprint navigation process, such as the navigation process described above with reference to FIG. 10. In act 1828, the computer system terminates the process 1800. In this example, the quality of the reference data is based on the number of value set matches that the reference data has with the target data sets included in the matching target data.

Examples in accord with the navigation process 1800 efficiently and effectively navigate large amounts of reference data and target date to identify small and precise navigation windows likely to include redundant data.

Figure 20:
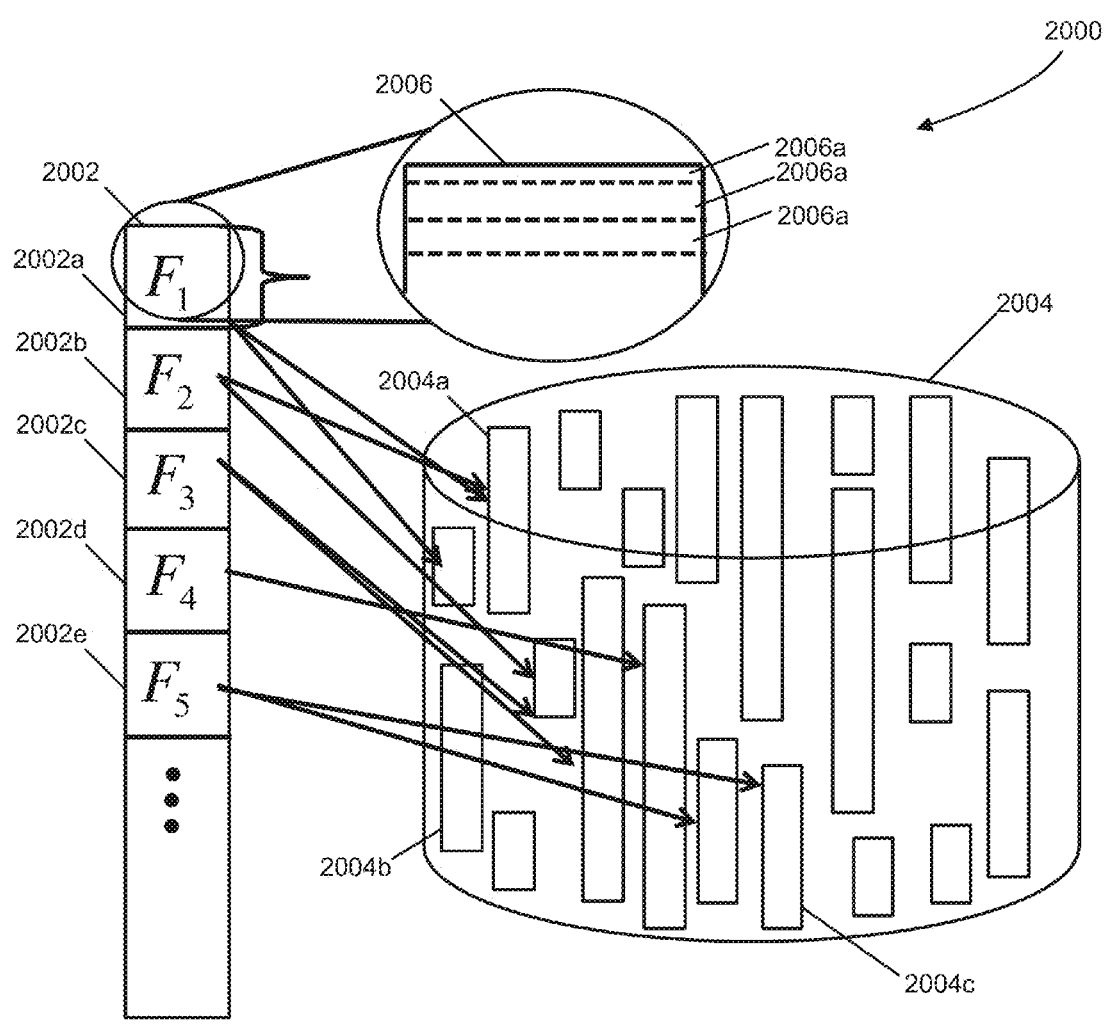
FIG. 20 is a schematic layout of exemplary data used in de-duplication processing.

FIG. 20 illustrates a particular example of associations recorded between elements included in data 2000 prior to execution of the micro-fingerprint navigation process in the act 1818. As shown, the data 2000 includes reference data 2002 and target data 2004. The target data 2004 includes target data sets 2004a, 2004b, and 2004c. The reference data 2002 includes reference data sets 2002a, 2002b, 2002c, 2002d, and 2002e. The reference data sets 2002a, 2002b, 2002c, 2002d, and 2002e that are respectively associated with macro-fingerprints $F_1$, $F_2$, $F_3$, $F_4$, and $F_5$, each of which characterizes data included in its corresponding reference data set. Each of the reference data sets 2002a, 2002b, 2002c, 2002d, and 2002e may have sufficient match potential with, and associated with, zero or more target data sets via macro-fingerprints $F_1$, $F_2$, $F_3$, $F_4$, and $F_5$. As shown FIG. 20, each of the macro-fingerprints $F_1$, $F_2$, $F_3$, $F_4$, and $F_5$ is matched to one or more target data sets. For example, $F_1$ and $F_2$ are matched with 2004a, among other target data sets.

In the example shown in FIG. 20, each of the reference data sets includes approximately 50 megabytes of data. Further, in this example, each of the reference data sets includes a plurality of navigation windows that may be associated with one or more of micro-fingerprints that characterize reference data located within the navigation windows. For instance, as shown in FIG. 20, the reference data set 2002a includes a range of data 2006 associated with a plurality of navigation windows 2006a. In this example, each of the plurality of navigation windows spans approximately 512 kilobytes.

Organized in the manner shown in FIG. 20, the data 2000 is configured for further, more precise, data de-duplication using the finer grain approach based on micro-fingerprints described herein.

As described above with reference to the act 1512, some examples maintain fingerprints to increase the efficiency of the de-duplication process. FIG. 19 illustrates one example maintenance process 1900 in accord with the act 1512. The navigation process 1900 begins at 1902. In act 1904, computer system reads the metricthreshold parameter. In act 1906, the computer system computes a de-duplication metric that indicates the amount of redundant data removed from each navigation window in which data was replaced with a pointer in the act 1510. In one example, the de-duplication metric is a de-duplication percentage with a value of 90%, but examples of the de-duplication metric are not limited to de-duplication percentage. In act 1908, for each navigation window in which data was replaced with a pointer in the act 1510, the computer system compares the de-duplication metric to the metricthreshold parameter. If the de-duplication metric transgresses a value specified by the metricthreshold parameter, the computer system executes act 1910. Otherwise, the computer system terminates the maintenance process 1900.

In the act 1910, the computer system removes the micro-fingerprint associated with each navigation window for which the de-duplication metric transgressed the value specified by the metricthreshold parameter. Next, the computer system determines whether one or more macro-fingerprints that characterize data also characterized by the removed micro-fingerprint include one or more of value sets with values equal to a value set included in the removed micro-fingerprint. If so, the computer system removes the one or more value sets from the one or more macro-fingerprints.

Examples in accord with the maintenance process 1900 reduce the number of fingerprints involved in de-duplication processing, thereby increasing the efficiency of the de-duplication process.

While the de-duplication processes described herein can be characterized as utilizing a two tiered hierarchy of fingerprints consisting of micro-fingerprints and macro-fingerprints, examples are not limited to a two-tiered fingerprint hierarchy. Thus examples disclosed herein may build and navigate fingerprint hierarchies consisting of three or more tiers. In these examples, additional macro-fingerprints may be generated from existing macro-fingerprints just as the initial macro-fingerprints are generated from existing micro-fingerprints.

Figure 21:
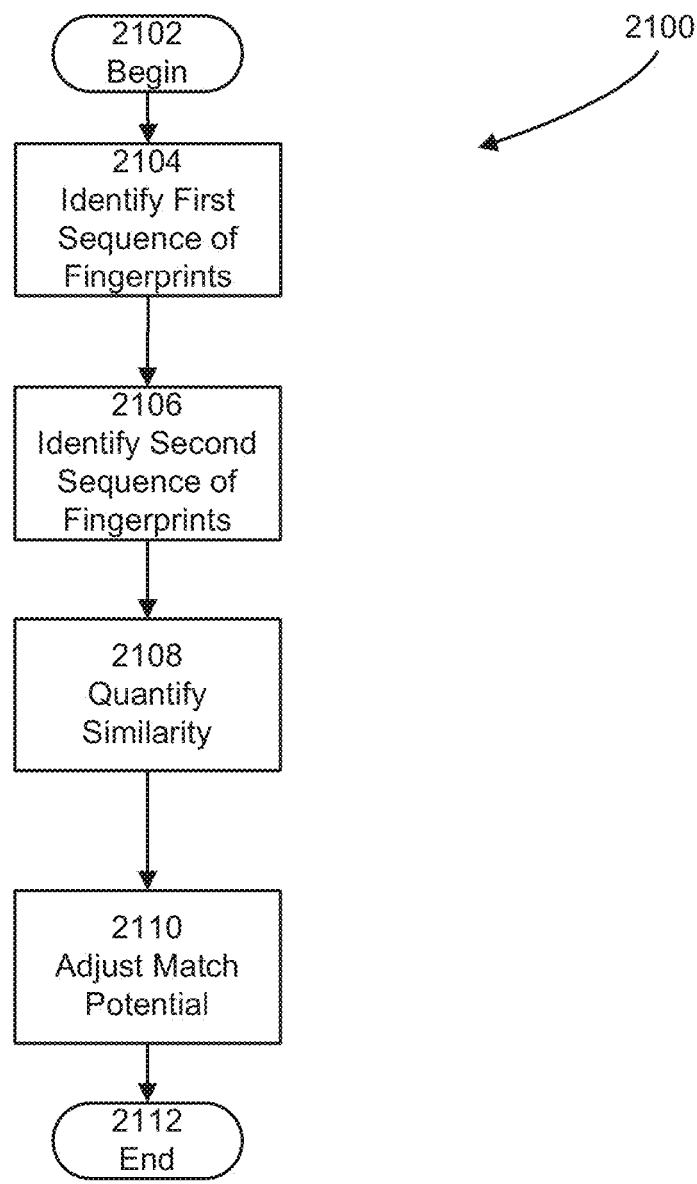
FIG. 21 is a flow diagram of a method for fingerprint pattern matching.

As described above, some examples include a computer system that executes a fingerprint pattern matching processes to adjust match potential (or other match quality assessments) associated with data. FIG. 21 illustrates one example fingerprint pattern matching process 2100 in accord with these examples. The fingerprint pattern matching process 2100 begins at 2102.

In act 2104, the computer system identifies a first sequence of (micro or macro) fingerprints that characterize sections of target data. Each member of the first sequence is a group of one or more fingerprints that characterize a distinct section of target data. The members of the first sequence are ordered within the first sequence according to an order of the sections characterized by the members within the target data.

In act 2106, the computer system identifies a second sequence of fingerprints that characterize sections of reference data and that include two or more fingerprints that each match at least one fingerprint in the first sequence. Each member of the second sequence is a group of one or more fingerprints that characterize a distinct section of reference data. The members of the second sequence are ordered within the second sequence according to an order of the sections characterized by the members within the reference data.

In act 2108, the computer system quantifies a similarity between the first sequence and the second sequence. The particular method used to quantify the similarity varies between embodiments. In one embodiment, the computer system computes a score for each section of target data characterized by a member of the first sequence. The score computed by the computer system may be a cumulative score aggregated from a plurality of individual scores.

In some embodiments, the individual scores for a section of target data are calculated by comparing ordinal positions of members within the first sequence to ordinal positions of members within the second sequence. In these embodiments, the members of the first sequence that are compared include the member containing the one or more fingerprints that characterize the section being scored (referred to herein as the "section member") and another member within a predetermined distance (e.g., number of members) of the section member within the first sequence. In some examples the predetermined number of members is three. Further, in these embodiments, the members of the second sequence that are compared include two members of the second sequence that include fingerprints that match the fingerprints included in the members of the first sequence. In these embodiments, the magnitude of the individual score is directly related to the number of matching fingerprints included in members having the same ordinal position within their respective sequences.

Also, in these embodiments, the cumulative score for the section is calculated from two or more individual scores. Each of the individual scores aggregated within the cumulative score may be computed from combinations including the section member and other members within the first sequence, subject to the distance restriction described above. The process executed to calculate the cumulative score may be iterative and may, when considered in total, may compare one or more overlapping subsequences of the first sequence to one or more overlapping subsequences of the second sequence.

In some embodiments, within the act 2108, the computer system continues to calculate scores for each section of target data characterized by a member of the first sequence until all sections have been scored or until the computer system detects the presence of stop criteria within the sequences of fingerprints. Examples of stop criteria include back hitching. Back hitching describes a situation in which sections of the target data are ordered in a series that is counter to a series in which associated sections of the reference data are ordered. One example of back hitching is described further below with reference to FIG. 22.

In act 2110, the computer system adjusts the match potential (e.g., the match potential ratio) or the quality assessment of the sections of the target data according to the score calculated for each section of data. In at least one embodiment, this adjustment includes an addition of the score to the match potential. In act 2112, the computer system terminates the fingerprint matching process 2110.

Examples in accord with the fingerprint pattern matching process 2100 enable computer systems searching for redundant data to refine the match potential associated with specific sections of data to account for similarities in relative position of fingerprints in addition to fingerprint values. Such processes are especially useful in processing situations in which a large number of potential matches have been detected. In these situations a fingerprint pattern matching process enables a de-duplication process to filter the large number of potential matches and isolate on the sections of target data mostly likely to include redundant data.

Figure 22:
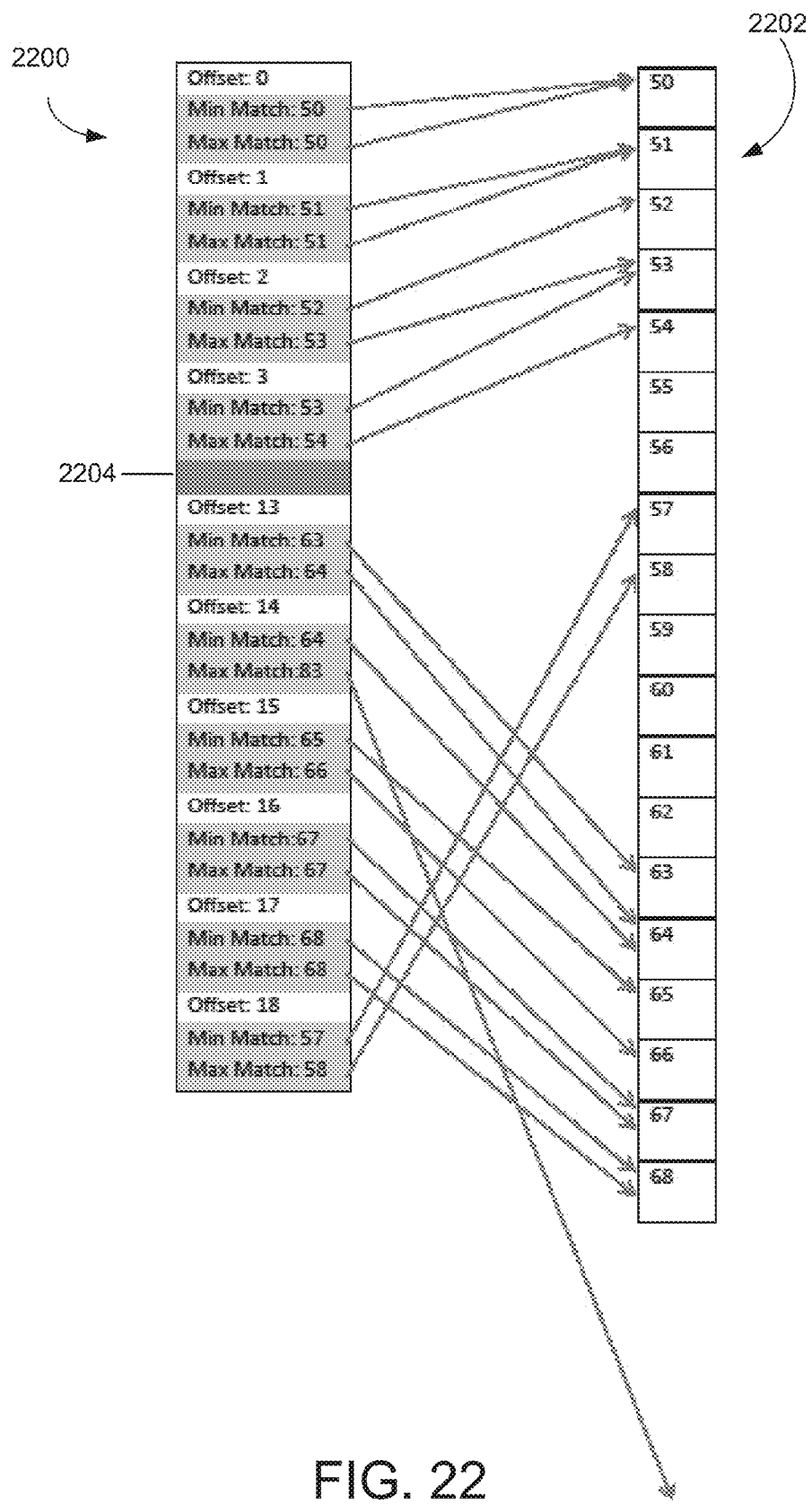
FIG. 22 is a schematic layout of one example of two data sets used in a fingerprint pattern matching process.

One example of a fingerprint pattern matching process in accord with the process 2100 will now be described with reference to FIG. 22. FIG. 22 illustrates target data 2200 and reference data 2202. The target data 2200 includes a plurality of sections (e.g., offsets 0 through 18) and a gap 2204. The reference data 2202 also includes a plurality of sections (e.g., offsets 50 through 68).

In this example, each offset listed in the target data 2200 and the reference data 2202 has at least one fingerprint that characterizes data associated with the offset. Further, in this example, each of the fingerprints that characterize an offset in the target data 2200 matches at least one fingerprint that characterizes an offset in the reference data 2202. For instance, offset 0 is associated with data characterized by one or more fingerprints that match one or more fingerprints that characterize data associated with offset 50 in the reference data 2202. Thus the offset 0 is associated with the matching offset 50, as indicated by the arrows drawn between the offset 0 and the offset 50. In addition, as shown by arrows within in FIG. 22, the minimum offset (in terms of ordinal position) within the reference data 2202 associated (via matching fingerprints) with the offset 0 is the offset 50 and the maximum offset within the reference data 2202 associated with the offset 0 is the offset 50. The gap 2204 is a section of data that is either not characterized by a fingerprint or which is characterized by a fingerprint that does not have a matching fingerprint that characterizes data within the reference data 2202.

During the execution of a fingerprint pattern matching process in accord with the process 2100, in the act 2104, the computer system identifies a first sequence of fingerprints for the target data 2200. In the act 2106, the computer system identifies a second sequence of fingerprints for the reference data 2202. The fingerprints included in both sequences are grouped by offset (member).

In the act 2108, the computer system quantifies the similarity between the sequences as follows. The computer system calculates relativity scores for each offset within the target data 2200 by determining whether the offset and another offset within the target data 2200 are associated with offsets within the reference data 2202 that have the same (or similar) positions relative to one another as the target offsets.

Figure 23:
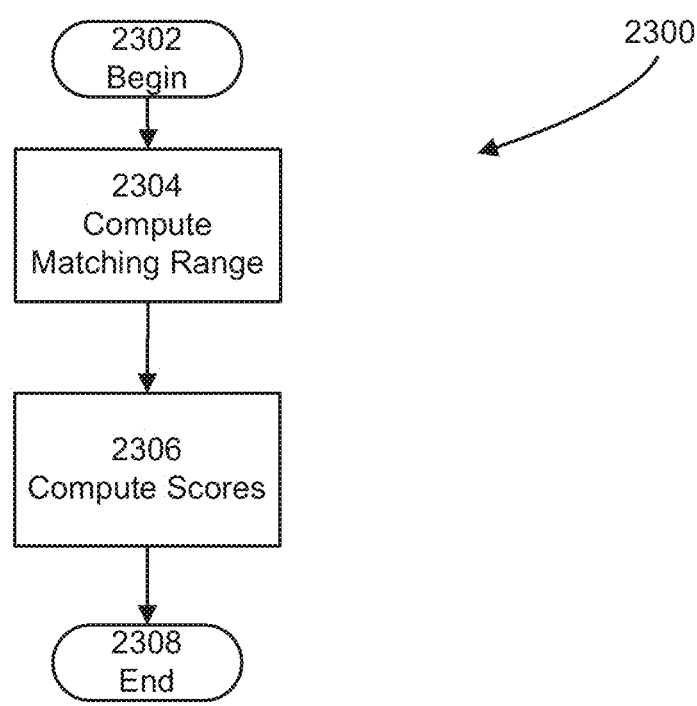
FIG. 23 is a flow diagram of a method for scoring sections of data.

To compute score, the computer system executes a scoring process such as the scoring process 2300 illustrated in FIG. 23. The scoring process 2300 begins at 2302.

In act 2304, the computer system computes matching ranges for the offsets within the target data 2200. Each matching range includes a minimum ordinal position and a maximum ordinal position. In some embodiments, the minimum ordinal position for a matching range of a particular offset is the ordinal position of an offset within the reference data 2202 that is associated (via matching fingerprints) with the particular offset and that has an ordinal position that is less or equal to other ordinal positions of offsets within the reference data 2202 that are associated with the particular offset. In these embodiments, the maximum ordinal position for a matching range of a particular offset is the ordinal position of an offset within the reference data 2202 that is associated (via matching fingerprints) with the particular offset and that has an ordinal position that is greater than or equal to other ordinal positions of offsets within the reference data 2202 that are associated with the particular offset. As shown in FIG. 22, the matching range for offset 0 is (50, 50), the matching range of offset 1 is (51, 51), and the matching range of offset 14 is (64, 83). Some embodiments use a matching range, rather than a single matching value, to increase the power of the score to indicate the presence of redundant data.

In some examples, during the act 2304, the computer system scans for stop conditions within the first sequence of fingerprints. Examples of stop conditions include back hitches. Back hitches are present where the match range of an offset includes ordinal positions that are less than the previous offset's match range. Offset 18 in FIG. 22 illustrates one example of a back hitch. In some examples, the computer system stops executing the act 2304 upon detecting a back hitch and proceeds to act 2306.

In the act 2306, the computer system evaluates the following inequalities for j=1 to 3 (or some other constant parameter) for each offset$_i$ within the target data 2200:

$$MinMatch_i \leq (MinMatch_{i+j} - (Offset_{i+j} - Offset_i)) \leq MaxMatch_i$$

$$MinMatch_i \leq (MinMatch_{i+j} - (Offset_{i+j} - Offset_i)) \leq MaxMatch_i$$

Where:

MinMatch$_i$ is the minimum ordinal position of the matching range for Offset$_i$;

MaxMatch$_i$ is the maximum ordinal position of the matching range for Offset$_i$;

MinMatch$_{i+j}$ is the minimum ordinal position of the matching range for Offset$_{i+j}$;

MaxMatch$_{i+j}$ is the maximum ordinal position of the matching range for Offset$_{i+j}$;

Offset$_i$ is the ordinal position of the offset$_i$ within the target data; and Offset$_{i+j}$ is the ordinal position of the offset$_{i+j}$ within the target data;

As illustrated in the inequalities recited above, the computer system may adjust the ordinal positions of the MinMatch and MaxMatch within the reference data 2202 by the difference in ordinal position between the associated offsets within the target data 2200.

For each evaluation in which one f the inequality listed above is true, the computer system increments the score associated with offset$_i$. FIG. 24 shows the results of the act 2306 when executed for the target data 2200. The cumulative score for each offset in the target data 2200 is an aggregation of multiple individual scores. Given the individual scores listed in FIG. 24, the cumulative scores for the offsets in the target data 2200 are given in Table 1:

TABLE 1

| Offset | Score |
| --- | --- |
| Offset 0 | 4 |
| Offset 1 | 5 |
| Offset 2 | 7 |
| Offset 3 | 9 |
| Offset 13 | 10 |
| Offset 14 | 9 |
| Offset 15 | 10 |
| Offset 16 | 8 |
| Offset 17 | 6 |
| Offset 18 | 0 |

In act 2308, the computer system terminates the scoring process 2300.

Processes in accord with the scoring process 2300 enable computer systems to quantify the similarity between sequences of fingerprints that characterize data. In so doing, such scoring processes enable the computer systems to identify sections of data that are more likely to include redundant data than other sections.

It is to be appreciated that embodiments disclosed herein are not limited to the scoring process 2300. For instance, while the scoring process 2300 utilizes a matching range to score similarity between sequences, other embodiments may execute scoring processes that utilize a single matching value or three or more matching values. In addition, while the scoring process 2300 compares subsequences having four members, other embodiments may compare subsequences having fewer or more members.

Returning to the example illustrated in FIG. 22, the computer system executing the fingerprint pattern matching process executes the act 2110 and adjusts the match potential of the offsets in the target data 2200 according to the scores listed in Table 1.

Figure 25:
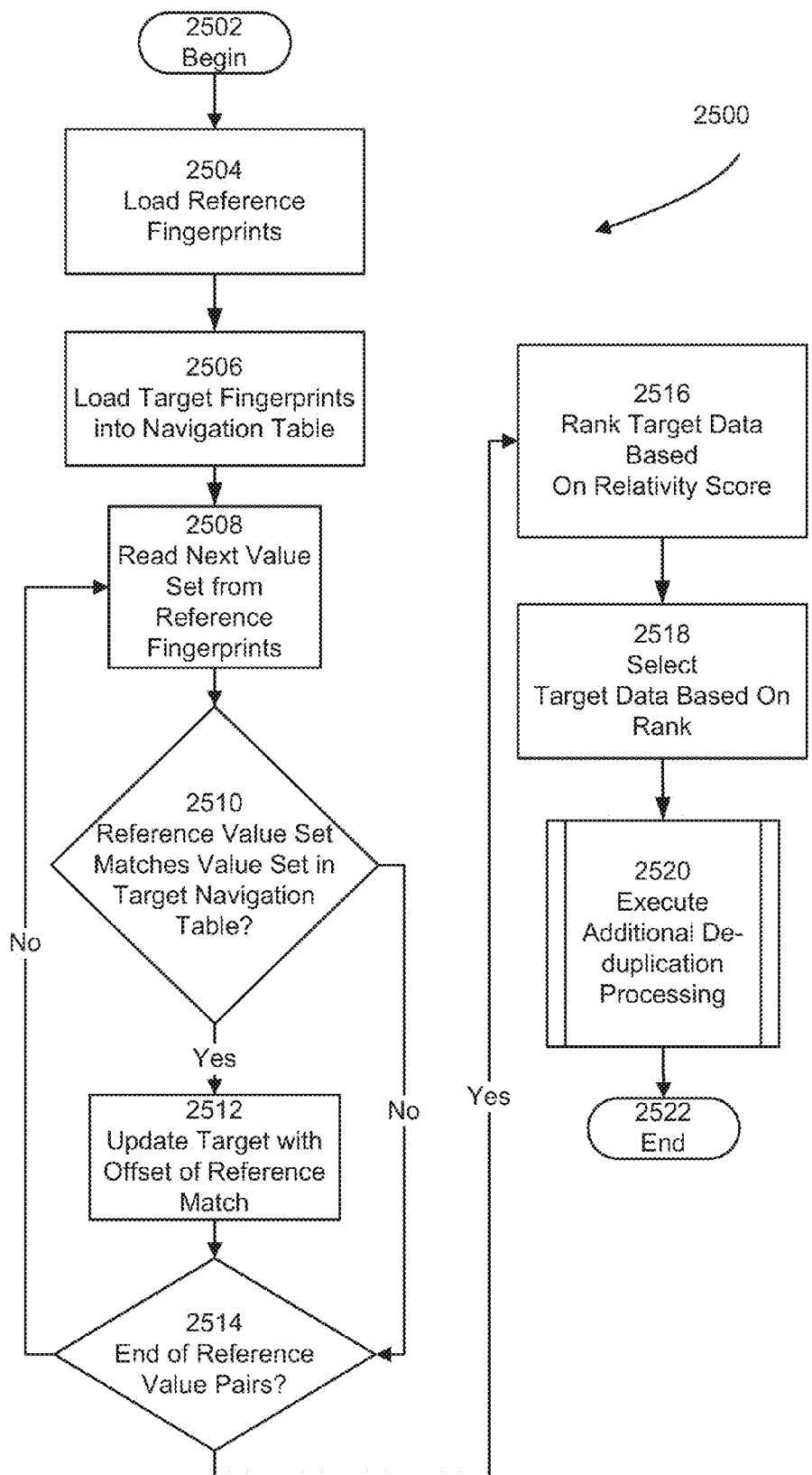
FIG. 25 is a flow diagram of another method for navigating target and reference data.

FIG. 25 illustrates one example navigation process 2500 that may be executed by the navigator 510 and that computes a degree of similarity between sequences of fingerprints and uses the computed degree of similarity to select regions of data to de-duplicate. The navigation process 2500 begins at 2502. In act 2504, a computer system loads one or more fingerprints (for example, micro-fingerprints or macro-fingerprints) associated with reference data (for example, a most recent backup data set) into memory.

In act 2506, the computer system loads one or more fingerprints associated with target data (for example, a previously backed up data set that has not been completely de-duplicated) into a target navigation table. The target data may include a plurality of target data sets, each with an individual set of fingerprints that characterizes its content. In act 2508, the computer system reads the next value set from the reference fingerprints.

In act 2510, the computer system determines whether the next value set read from the reference fingerprints matches (e.g., is equal to) a value set stored in the target navigation table. If so, in act 2512, the computer system records identifiers of the matching value sets. For example, the computer system may update the matching entry in the target navigation table with an identifier of the offset of the reference fingerprint within the reference data. Otherwise, the computer system executes act 2514.

In act 2514, the computer system determines whether additional, unprocessed reference fingerprint entries exist. If so, the computer system returns to the act 2508. Otherwise, the computer system computes relativity scores, as described above with reference to FIG. 23, and ranks areas within the target data based on the relativity scores of fingerprints associated with the target data within act 2516.

In act 2518, the computer system selects the target data areas based on their rank. For example, a computer system executing the act 2518 may select the top X areas, where X is a configurable parameter (for example, X may equal 10).

In act 2520, the computer system executes additional de-duplication processing. For example, where the fingerprints processed within the navigation process 2500 are macro-fingerprints, a computer system may execute, within the act 2520, a distinct micro-fingerprint navigation process in accord with the navigation process 2500. In another example, where the fingerprints processed within the navigation process 2500 are micro-fingerprints, the computer system may execute, within the act 2520, a process that de-duplicates the target areas, such as the de-duplication process described above with reference to FIG. 2. The computer system terminates the navigation process 2500 in act 2522.

Examples in accord with the navigation process 2500 efficiently and effectively utilize relativity scores to identify and de-duplicate target data.

Each of the processes disclosed herein depicts one particular sequence of acts in a particular example. The acts included in each of these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. In addition, as discussed above, in at least one example, the acts are performed on a particular, specially configured machine, namely a computer system configured according to the examples disclosed herein.

In general summary, examples and aspects of the disclosed herein include a storage system and methods that de-duplicate data using an approach that adapts to the characteristics of the data being de-duplicated. While the bulk of the specification discusses data de-duplication in the context of a back-up storage system, various aspects of the embodiments disclosed herein may be used in other contexts, such as de-duplication of primary application data. In addition, while the specification focuses on data sets including a plurality of windows, some examples include data sets which only have one window. Moreover, while the bulk of the specification focuses on weak hash functions and XOR hash functions, many other hash functions are known and may be employed in various examples.

Having thus described several aspects of at least one example, it is to be appreciated various alterations, modifications, and improvements will readily occur to those skilled in the art. Such alterations, modifications, and improvements are intended to be part of this disclosure, and are intended to be within the scope of the embodiments disclosed herein. Accordingly, the foregoing description and drawings are by way of example only.

What is claimed is:

1. A method of computing match potential between first data and second data, the method comprising:

identifying, by one or more processors, a first sequence of fingerprints characterizing a first plurality of sections of the first data, the first sequence being ordered according to an order of the first plurality of sections within the first data;

identifying a second sequence of fingerprints comprising fingerprints that match fingerprints within the first sequence, the second sequence of fingerprints characterizing a second plurality of sections of the second data, the second sequence being ordered according to an order of the second plurality of sections within the second data, wherein the first sequence includes a plurality of first subsequences, each first subsequence comprising one or more of the fingerprints of the first sequence, and the second sequence includes a plurality of second subsequences, each second subsequence comprising one or more of the fingerprints of the second sequence;

quantifying a similarity between the first sequence and the second sequence by quantifying a similarity between at least one first subsequence of the plurality of first subsequences and at least one second subsequence of the plurality of second subsequences by computing at least one score for at least one first section of the first plurality of sections, the at least one first section being characterized by one or more fingerprints within the at least one first subsequence;

adjusting the match potential between the first data and the second data at least partially based on the quantified similarity; and performing de-duplication of at least a portion of the first plurality of sections at least partially based on the match potential, wherein:

the at least one first section is associated with a matching range that identifies at least one first ordinal position within the second data, the at least one first ordinal position being one or more ordinal positions of one or more of the second plurality of sections, the one or more of the second plurality of sections being characterized by one or more fingerprints that match one or more fingerprints characterizing the at least one first section; and computing the at least one score for the at least one first section includes:
  selecting a plurality of combinations of sections from a subset of the first data, the subset being characterized by fingerprints included in the at least one first subsequence, each of the plurality of combinations including the at least one first section and at least one second section of the subset, the at least one second section being associated with one or more matching sections within the second plurality of sections, the one or more matching sections being characterized by at least one fingerprint that matches at least one fingerprint characterizing the second section;
  computing one or more adjusted ordinal positions for the one or more matching sections based on an ordinal position of the first section, an ordinal position of the second section, and one or more ordinal positions of the one or more matching sections; and
  increasing the score for each adjusted ordinal position of the one or more adjusted ordinal positions disposed within the matching range of the at least one first section.

2. The method according to claim 1, wherein performing the de-duplication of at least the portion of the first plurality of sections comprises:
  performing at least one additional process to determine that at least the portion of the first plurality of sections and at least a portion of the second plurality of sections are indicated to include duplicate data; and
  storing, for at least the portion of the first plurality of sections, reference information that references at least the portion of the second plurality of sections.

3. The method according to claim 1, wherein a magnitude of the at least one score is related to a number of matching fingerprints having a same order within the first sequence and the second sequence.

4. The method according to claim 1, wherein quantifying the similarity includes quantifying a similarity between subsequences of the plurality of first subsequences that overlap other subsequences of the first plurality of subsequences and subsequences of the second subsequences that overlap other subsequences of the plurality of second subsequences.

5. The method according to claim 1, further comprising terminating quantification of the similarity when the at least one first ordinal position is less than at least one second ordinal position identified in a matching range associated with a section of the first data having an ordinal position that is greater than the at least one first section.

6. The method according claim 1, wherein
  the at least one first ordinal position includes a plurality of ordinal positions, and
  increasing the score includes increasing the score for each adjusted ordinal position within a matching range that identifies the plurality of ordinal positions.

7. The method according to claim 6, wherein
  the plurality of ordinal positions includes two ordinal positions, one of the two ordinal positions being a minimum ordinal position of the at least one first section, and another of the two positions being a maximum ordinal position of the at least one first section, and
  increasing the score includes increasing the score for each adjusted ordinal position within a matching range that identifies the minimum ordinal position and the maximum ordinal position.

8. A system configured to compute match potential between first data and second data, the system comprising:
  data storage storing the first data and the second data; and
  at least one processor coupled to the data storage and configured to:
    identify a first sequence of fingerprints characterizing a first plurality of sections of the first data, the first sequence being ordered according to an order of the first plurality of sections within the first data;
    identify a second sequence of fingerprints comprising fingerprints that match fingerprints within the first sequence, the second sequence of fingerprints characterizing a second plurality of sections of the second data, the second sequence being ordered according to an order of the second plurality of sections within the second data, wherein the first sequence includes a plurality of first subsequences, each first subsequence comprising one or more of the fingerprints of the first sequence, and the second sequence includes a plurality of second subsequences, each second subsequence comprising one or more of the fingerprints of the second sequence;
  quantify a similarity between the first sequence and the second sequence by quantifying a similarity between at least one first subsequence of the plurality of first subsequences and at least one second subsequence of the plurality of second subsequences by computing at least one score for at least one first section of the first plurality of sections, the at least one first section being characterized by one or more fingerprints within the at least one first subsequence;
  adjust the match potential between the first data and the second data at least partially based on the quantified similarity; and
  perform de-duplication of at least a portion of the first plurality of sections at least partially based on the match potential, wherein:
  the at least one first section is associated with a matching range that identifies at least one first ordinal position within the second data, the at least one first ordinal position being one or more ordinal positions of one or more of the second plurality of sections, the one or more of the second plurality of sections being characterized by one or more fingerprints that match one or more fingerprints characterizing the at least one first section; and
  the at least one processor is configured to compute the at least one score by, at least in part:
    selecting a plurality of combinations of sections from a subset of the first data, the subset being characterized by fingerprints included in the at least one first subsequence, each of the plurality of combinations including the at least one first section and at least one second section of the subset, the at least one second section being associated with one or more matching sections within the second plurality of sections, the one or more matching sections being characterized by at least one fingerprint that matches at least one fingerprint characterizing the second section;
    computing one or more adjusted ordinal positions for the one or more matching sections based on an ordinal position of the first section, an ordinal position of the second section, and one or more ordinal positions of the one or more matching sections; and increasing the score for each adjusted ordinal position of the one or more adjusted ordinal positions disposed within the matching range of the at least one first section.

9. The system according to claim 8, wherein the at least one processor is configured to perform the de-duplication of at least the portion of the first plurality of sections by:

performing at least one additional process to determine that at least the portion of the first plurality of sections and at least a portion of the second plurality of sections are indicated to include duplicate data; and storing, for at least the portion of the first plurality of sections, reference information that references at least the portion of the second plurality of sections.

10. The system according to claim 8, wherein the at least one processor is configured to quantify the similarly by quantifying a similarity between subsequences of the first plurality of subsequences that overlap other subsequences of the first plurality of subsequences and subsequences of the second subsequences that overlap other subsequences of the second plurality of subsequences.

11. The system according to claim 8, wherein the at least one processor is further configured to terminate quantification of the similarity when the at least one first ordinal position is less than at least one second ordinal position identified in a matching range associated with a section of the first data having an ordinal position that is greater than the at least one first section.

12. The system according claim 8, wherein the at least one first ordinal position includes a plurality of ordinal positions, and the at least one processor is configured to increase the score by, at least in part, increasing the score for each adjusted ordinal position within a matching range that identifies the plurality of ordinal positions.

13. The system according to claim 12, wherein the plurality of ordinal positions includes two ordinal positions, one of the two ordinal positions being a minimum ordinal position of the at least one first section, and another of the two positions being a maximum ordinal position of the at least one first section.

\* \* \* \* \*